US012662040B2

(12) United States Patent
  Sura et al.

(10) Patent No.: US 12,662,040 B2
(45) Date of Patent: Jun. 23, 2026

(54) RAIL-BASED LAUNCH AND RECOVERY SYSTEM AND KIT FOR LARGE UNMANNED UNDERSEA VEHICLES AND METHODS OF USE

(71) Applicant: USA as represented by the Secretary of the Navy, San Diego, CA (US)

(72) Inventors: Daniel A. Sura, San Diego, CA (US); Michael R. Koppi, Jr., San Diego, CA (US); Colin J. Fera, San Diego, CA (US); Gary L. Davis, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 654 days.

(21) Appl. No.: 18/157,269

(22) Filed: Jan. 20, 2023

(65) Prior Publication Data

US 2024/0246471 A1     Jul. 25, 2024

(51) Int. Cl.
  *B60P 3/10*        (2006.01)

(52) U.S. Cl.
  CPC ........... *B60P 3/1066* (2013.01); *B60P 3/1075* (2013.01)

(58) Field of Classification Search
  CPC .............................. B60P 3/1066; B60P 3/1075
  USPC ........................................................ 280/414.4
  See application file for complete search history.

(56) References Cited

U.S. PATENT DOCUMENTS

| | | | | |
|---|---|---|---|---|
| 3,031,093 | A * | 4/1962 | Holsclaw ............... | B60P 3/1075 414/533 |
| 3,204,790 | A * | 9/1965 | Collins ................. | B60P 3/1075 414/534 |
| 4,103,925 | A * | 8/1978 | Palamara .............. | B60P 3/1075 193/38 |
| 5,195,767 | A | 3/1993 | Des Roches | |
| 10,143,298 | B2 * | 12/2018 | Wood ................. | A47B 47/0008 |
| 10,682,943 | B1 * | 6/2020 | Scott, IV .............. | B60P 7/0892 |
| 2011/0133429 | A1 * | 6/2011 | Caudill ................. | B60P 3/1075 280/414.1 |

(Continued)

OTHER PUBLICATIONS

Conolift Marine Hydraulic Equipment (Brochure), Kropf Industrial Inc., 1 Quebec Drive, Seguin ON P2A0B2, undated.
(Continued)

*Primary Examiner* — Alentin Neacsu
*Assistant Examiner* — Mohamed M Medani
(74) *Attorney, Agent, or Firm* — Naval Information Warfare Center, Pacific; Kyle Eppele; Paul C. Oestreich

(57) ABSTRACT

The invention disclosed herein include system, kit and method embodiments for transportation, launch and recovery of large watercraft, particularly large unmanned underwater vehicles (UUVs). Features of the system and kit embodiments may include, but are not limited to guide rails with guide wheels mounted to the open end of a marine trailer that may be fixed or rotating between an open V-shaped position for guiding the watercraft during launch and recovery and a closed parallel position when loaded and during transportation, mounting adapter assemblies that allow the guide rails to tilt vertically to compensate for boat ramp gradient and cable guide posts for maintaining the tow cable within the open end of the trailer during launch and recovery.

23 Claims, 16 Drawing Sheets

(56) References Cited

U.S. PATENT DOCUMENTS

2018/0264986 A1 * 9/2018 Hooper ..................... B60P 3/10

OTHER PUBLICATIONS

OTR-20 Marine Hydraulic Trailer (Specification), Kropf Industrial Inc., 1 Quebec Drive, Seguin ON P2A0B2, Nov. 1, 2013.
OTR-30 Marine Hydraulic Trailer (Specification), Kropf Industrial Inc., 1 Quebec Drive, Seguin ON P2A0B2, Nov. 1, 2013.
Charles Loeffler, "Loading onto R/V Storm and Shakedown", NOAA Ocean Exploration, https://oceanexplorer.noaa.gov/explorations/10thunderbay/logs/aug17/aug17.html, Aug. 17, 2010.
Kropf Conolift Marine Hydraulic Equipment (Conolift Webpage), www.kropfindustrial.com/conolift.

* cited by examiner

RAIL-BASED LAUNCH AND RECOVERY SYSTEM AND KIT FOR LARGE UNMANNED UNDERSEA VEHICLES AND METHODS OF USE

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 111066.

BACKGROUND OF THE INVENTION

Field of the Invention

The present invention relates generally to watercraft trailers. More particularly, this invention relates to a rail-based launch and recovery system used to transport unmanned or autonomous undersea vehicles.

Description of Related Art

Conventional boat trailers are well-known to those of ordinary skill in the art. Such conventional trailers are used to transport, launch and retrieve watercraft such as power and sailboats of various sizes. Such conventional trailers typically include a frame with a tongue on one end (towing end) and loading/unloading end opposite the tongue and is supported above ground by wheels. Such conventional trailers typically further include support structure mounted on the frame for engaging the hull of the watercraft during transportation over the road or when the launching or loading the watercraft onto the trailer. There are various configurations of support structure that can accommodate watercraft with hull topologies ranging up to the deep keels on sailboat.

There are some unique challenges facing watercraft launch and recovery during difficult environmental conditions. For example, watercraft drift arising from large currents, tidal fluctuations and/or high winds acting on the surface area of the watercraft make it difficult to guide the watercraft onto and off of a transportation trailer. Such conditions are particularly challenging with watercraft having virtually no keel. For example, it may be difficult to launch or recover a large autonomous or unmanned underwater vehicle (UUV), or any other watercraft, that may lack significant keel topology on its hull that may otherwise counteract lateral watercraft drift.

Conventionally, this problem typically requires using more manpower with multiple lines or tow ropes secured to the watercraft to control the watercraft under high drift conditions to safely launch or recover the watercraft and avoid damage from uncontrolled collision with support structure on the trailer or other objects. Such conventional methods still suffer from miscommunication and human error that may result in unwanted watercraft collision with various objects that may come into contact with the watercraft during launch and recovery. Additionally, the narrow opening opposite the towing end of a trailer makes it difficult to align the watercraft during loading and may require repetitive trial and error until the watercraft can be safely guided through the narrow opening and winched onto the trailer for transport.

In view of the foregoing, there exists a need in the art for improved methods, kits or systems for launch, recovery and transport of watercraft, especially under challenging conditions.

SUMMARY OF THE INVENTION

An embodiment of a system for transportation, launch and recovery of watercraft is disclosed. Embodiments of the system may include a trailer having an open end, a towing end opposite the open end, a right longitudinal beam, a left longitudinal beam, wherein the beams extend between the ends, the beams spaced apart from and parallel to one another thereby forming a cradle between the beams configured to carry the watercraft. The system embodiment may further include laterally and vertically adjustable support structures extending perpendicularly between and underneath the beams to form a bottom of the cradle. The system embodiment may further include a winch located between the open and the towing ends, the winch configured to selectively reel a tow cable connected between the winch and the watercraft. The system embodiment may further include right and left guide rails symmetrically mounted on respective beams at the open end, the rails configured to guide the watercraft into and out of the cradle when submerged in water, the guide rails capable of orientation in an open V-shaped position when viewed from above. The embodiment of the guide rails may each further include perpendicularly extending cable guide posts configured to maintain the tow cable between the rails.

An embodiment of a kit configured for converting a large watercraft trailer for use in transportation, launch and recovery of a UUV is disclosed. Embodiments of the trailer may include an open end, a towing end opposite the open end, a right longitudinal beam, a left longitudinal beam, wherein the beams extend between the ends and are configured with accessory holes, the beams spaced apart from and parallel to one another thereby forming a cradle between the beams configured to carry the UUV. Embodiments of the kit may include laterally and vertically adjustable support structures extending perpendicularly between and underneath the beams and mounted to the accessory holes and forming a bottom of the cradle. Embodiments of the kit may further include a winch with a tow cable located between the open and the towing ends and configured to selectively reel the tow cable connected between the winch and the UUV. Embodiments of the kit may further include left and right guide rails symmetrically mounted on respective beams at the open end configured to guide the UUV into and out of the cradle when submerged in water, the guide rails capable of orientation in an open V-shaped position when viewed from above and the guide rails each further comprising perpendicularly extending cable guide posts configured to maintain the tow cable within the open end of the trailer.

An embodiment of a method for recovering a large UUV from water is disclosed. The embodiment of the method may include the step of providing a dinghy for selectively attaching a tow cable to the UUV in the water. The embodiment of the method may further include the step of providing a rigid-hulled inflatable boat (RHIB) with thrusters and at least one RHIB mounted winch. The embodiment of the method may further include the step of providing a system for transportation, launch and recovery of the UUV. The embodiment of the method may further include the step of positioning the system in the water from a boat ramp open end first. The embodiment of the method may further include the step of towing the UUV using the RHIB and the at least one RHIB winch, each of the at least one RHIB winch having a RHIB tow cable configured to be connected to the UUV to guide the UUV near the open end. The embodiment of the method may further include the step of attaching the tow cable to the UUV using the dinghy. The embodiment of the method may further include the step of stationkeeping the UUV using the RHIB thrusters, the at least one RHIB winch and the at least one RHIB tow cable. The embodiment of the method may further include the step of winching the UUV into the cradle of the trailer. The embodiment of the method may further include the step of releasing the tow cable and the at least one RHIB cable from the UUV. The embodiment of the method may further include the step of driving the system with loaded UUV in the cradle up the boat ramp and out of the water.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
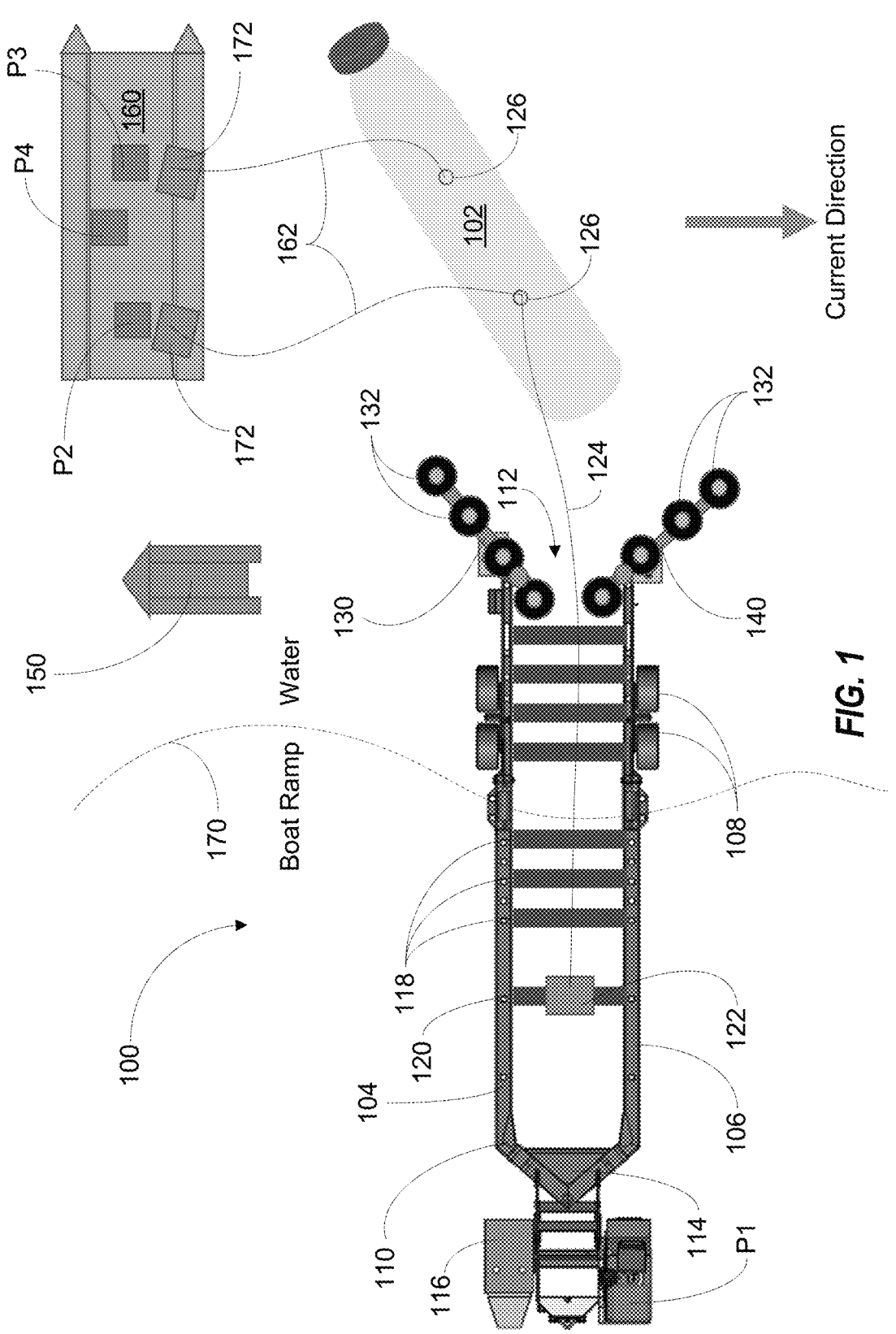
FIG. 1 is a top view diagram of an embodiment of a rotating rail-based watercraft launch and recovery system, according to the present invention.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Embodiments of the present invention include various configurations of a system, and more particularly a rail-based watercraft trailer, used to transport, launch and recover large watercraft. The invention is particularly useful for launch and recovery of a large autonomous or unmanned underwater vehicle (UUV). While the particular embodiments shown and described herein are directed to large UUVs, it will be understood that novel and nonobvious features of the invention will be applicable in the context of other types of large watercraft, not just an UUV. Methods of launching and recovering a UUV using an embodiment of the trailers disclosed herein are also disclosed. A kit embodiment is also disclosed.

The various embodiments of the present invention solve the technical problem of launching and recovering large UUVs under adverse conditions such as cross-currents, wind-loading and nearby support structures such as a pier. Particular embodiments of the rail-based launch and recovery systems disclosed herein are improvements to existing trailers and may be in the form of a kit with specialized equipment used to adapt conventional watercraft trailers to solving the technical problem of launching and recovering large UUVs under adverse conditions. In view of the usefulness of the system embodiments of the present invention and the application of the invention as a technical solution to the problem of launching and recovering large UUVs described herein, particular embodiments will now be described in detail with reference to the drawing FIGS.

Figure 2:
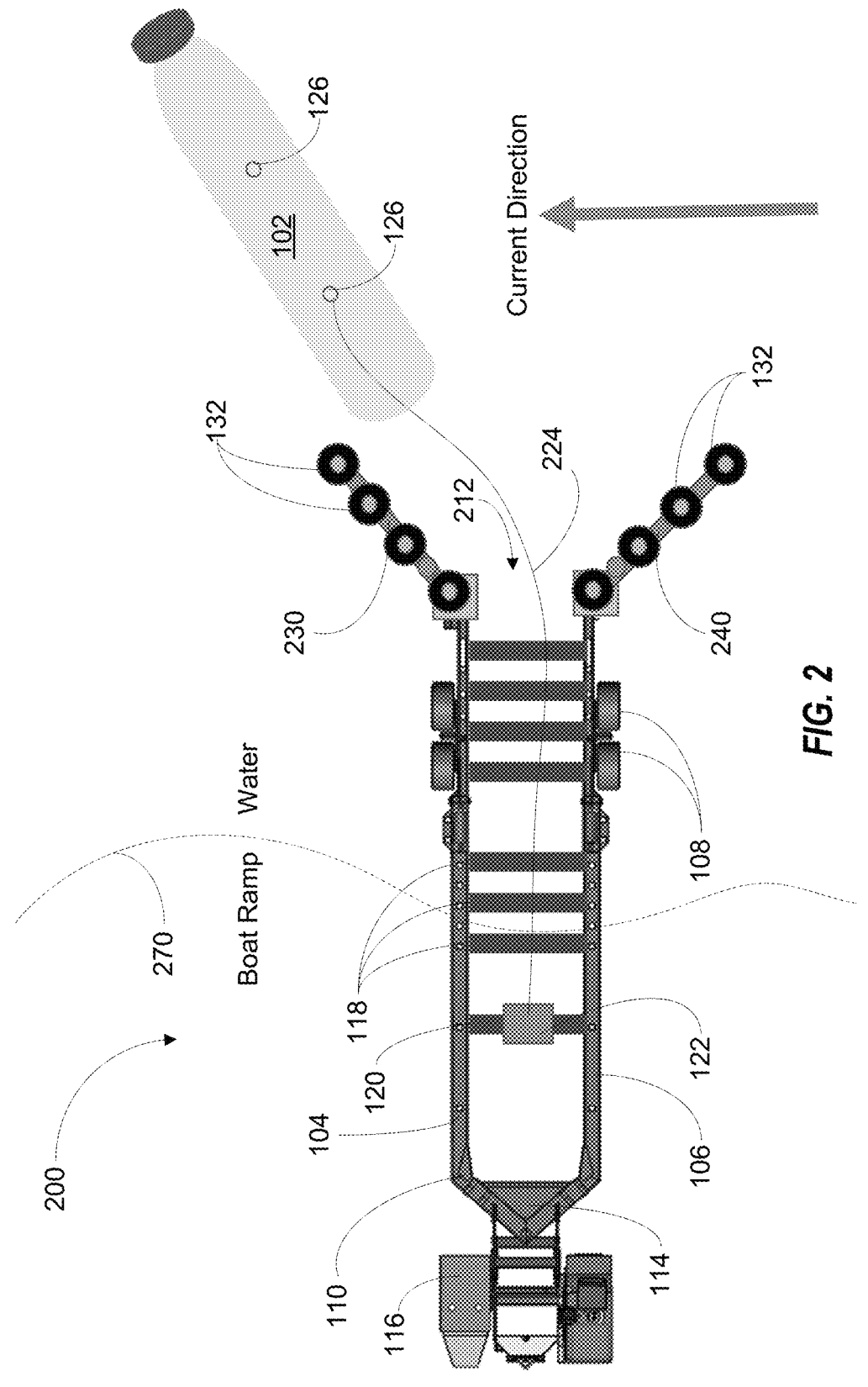
FIG. 2 is a top view diagram of an embodiment of a fixed rail-based watercraft launch and recovery system, according to the present invention.

FIG. 2 is a top view diagram of an embodiment of a fixed rail-based launch and recovery system 200 as it would be used to recover (and launch) a large UUV 102 from a boat ramp or any other suitable inclined water/ground interface, see dashed water line 270, according to the present invention. As shown in FIG. 2 the UUV 102 may be subject to drift under current or wind loading conditions making it more difficult to recover and pull onto system 200. Note that FIG. 2 is diagrammatic only and the objects shown therein may or may not be shown to relative or proportional sizes.

System 200 may include a trailer 110 having two opposed longitudinal beams 104 and 106 which are in turn supported on the ground by a wheels 108 (4 shown in FIG. 2). Trailer 110 may further include an open end 212 and an opposed towing end 114. The open end 212 is configured to receive and release (launch) the UUV 102 from and into water, respectively. The towing end 114 of trailer 110 may be configured with a conventional ball-hitch mounting mechanism (not shown), a semi-trailer hitch mechanism for rotational connection to a towing vehicle (also not shown), a hydraulic tongue for adjustable leveling (not shown but see, e.g., Kropf Conolift Marine Hydraulic Equipment Brochure, available from: Kropf Industrial Inc., 1 Quebec Drive, Seguin ON P2A 0B2), or a self-propelled hydraulic fifth wheel tug (not shown but see, e.g., Kropf Conolift, Haulle™ Trailer Tugs, also available from: Kropf Industrial Inc.) It will be understood that such conventional vehicle towing mechanisms are well-known to one of ordinary skill in the art and thus will not be further elaborated herein. The illustrated towing end 114 may be equipped with a self-propelled fifth wheel 116 for use at a ship yard or any other boat launch ramp.

System 200 may further include embodiments of laterally adjustable structural supports 118 used to cradle the UUV 102 from below when out of the water. According to a couple embodiments, the laterally adjustable structural supports 118 may be hollow rectangular cross-sectioned beams or nylon webbing and are configured to be adjustable in length to accommodate various widths of UUV 102 on the trailer 110 cradled between the longitudinal beams 104 and 106. The number and location of the supports 118 may be adjusted according to the size and weight requirements of the particular UUV 102, according embodiments of the present invention. Various rectangular cross-sectioned beam embodiments of the laterally adjustable structural supports 118 will be further described and shown herein.

Figure 14:
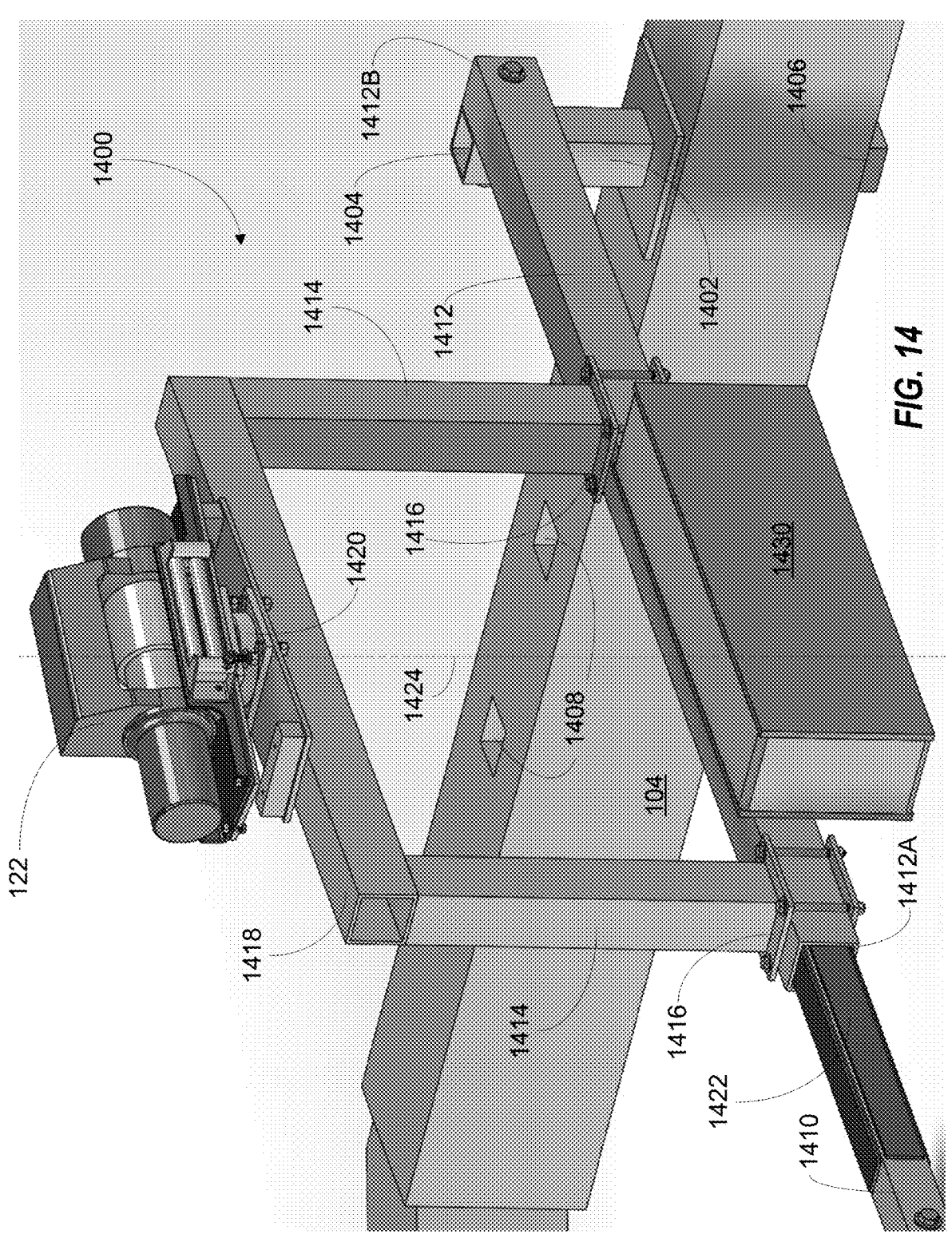
FIG. 14 is a perspective view of an embodiment of a winch and bump stop support, according to the present invention.

System 200 may further include a raised winch and bump stop support 120 mounted between the longitudinal beams 104 and 106 at an appropriate location between the open end 212 and the towing end 114 of trailer 110. The bump stop support 120 may be configured with a winch 122 for connection to the winch end of a tow cable 224. The tow cable 224 may be used to pull a watercraft or UUV 102 toward the open end 212 of trailer 110 during recovery. The UUV end of the tow cable 224 may be secured to an eyelet 126 (two shown in FIG. 2) or tie-down point on the UUV 102. Further details of an embodiment of the winch and bump stop support 120 are shown in FIG. 14 and related description herein.

System 200 may further include right and left fixed rail guide rails 230 and 240 mounted on respective longitudinal beams 104 and 106 at the open end 212 of trailer 110. According to this embodiment, the rail guide rails 230 and 240 are fixed in the open position open V-shaped position. Each fixed rail guide rail 230 and 240 may be equipped with a plurality (4 shown on each guide rail 230 and 240 in FIG. 2) of inflatable guide wheels 132 used to guide the UUV 102 in and out of the trailer 110. It will be understood that various configurations are possible with embodiments of a fixed rail system 200. For example in one configuration, the fixed guide rails 230 and 240 are permanently in the V-shaped "open" configuration. This permanently fixed open configuration works particularly well where the UUV 102 is merely being transported up into and out of a dock area with plenty of space for maneuvering the trailer 110. In another configuration, the fixed guide rails 230 and 240 are removable for storage or over-the-road transportation and thus reducing the footprint of trailer 110 and increasing its maneuverability in tight dock accommodations. Additional features of the fixed guide rails 230 and 240 are described below.

Figure 3:
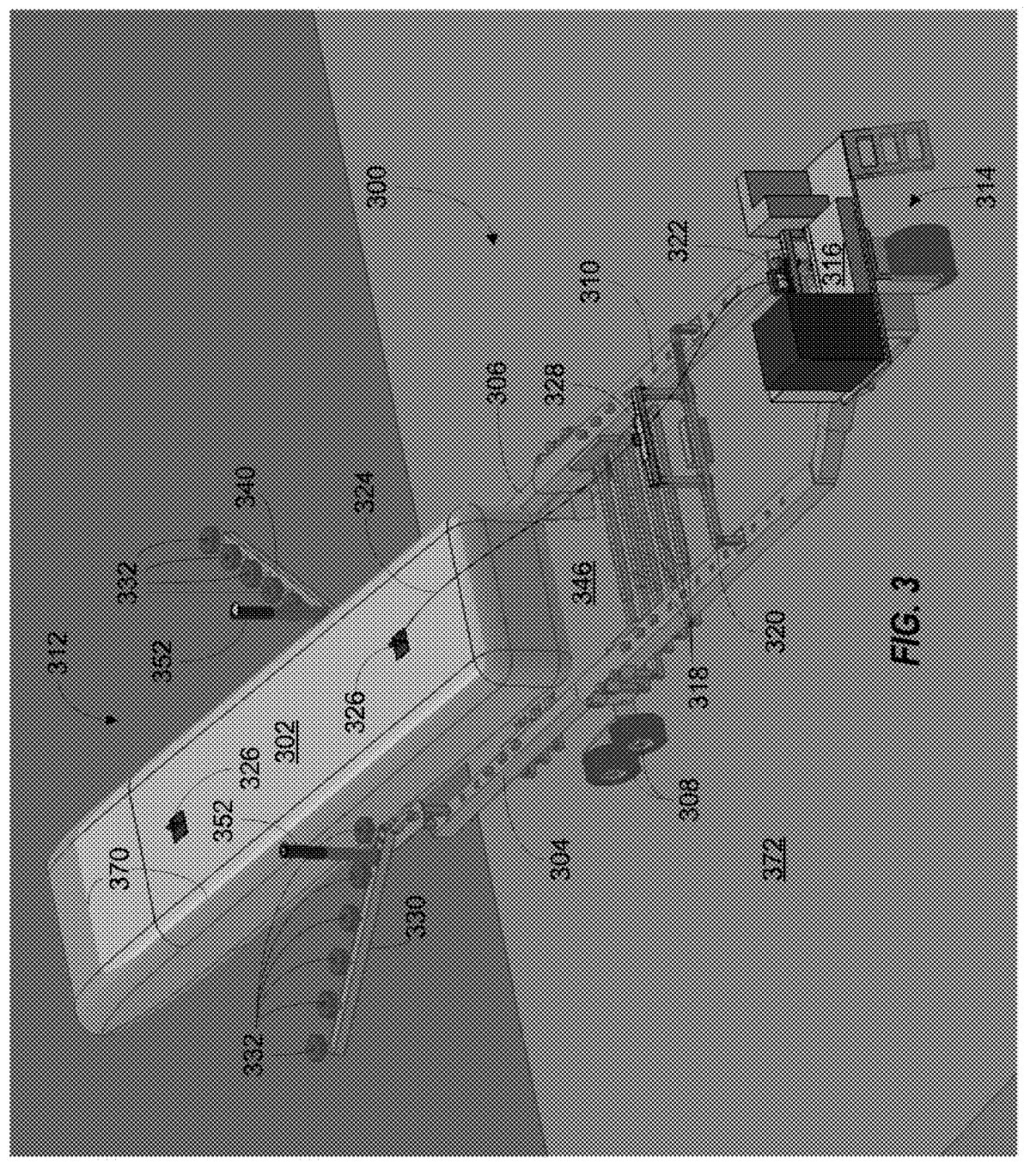
FIG. 3 is a perspective view diagram of another embodiment of a fixed rail-based watercraft launch and recovery system, according to the present invention.

FIG. 3 is a perspective view diagram of another embodiment of a fixed rail-based watercraft launch and recovery system 300, according to the present invention. System 300 may include a trailer 310 having right 304 and left 306 longitudinal beams supported from underneath by wheels 308. The illustrated embodiment of trailer 310 may further include right and left fixed guide rails 330 and 340, respectively, located at the open end 312 on respective beams 304 and 306. The fixed guide rails 330 and 340 are equipped with inflatable guide wheels 332 (six each) and cable guide posts 352.

The illustrated embodiment of trailer 310 is shown largely submerged in water (see waterline 370) on a boat ramp 372 with a UUV partially loaded at open end 312 and a self-propelled fifth wheel 316 at the towing end 314. According to the illustrated embodiment, the UUV 302 may pulled onto the cradle 346 of the trailer 310 by tow cable 324 connected at one end to an eyelet 326 on the UUV 302 and winch 322 at the other end of tow cable 324. Cradle 346 is the space between beams 304 and 306 on the right and left and the above the laterally adjustable structural supports 318 extending between the beams 304 and 306.

In this particular system 300, a sheave and bump stop 320 with its associated sheave 328 may be used to support tow cable 324 during launch and recovery of the UUV 302. The sheave 328 is located on the crown of sheave and bump stop 320 and supports the tow cable between the UUV 302 and winch 322. Note that in system 300, the winch 322 is located close to the towing end 314 of trailer 310. This particular configuration of system 300 is similar to system 200 except for the location of the winch 322 and the sheave and bump stop 320 with associated sheave 328. Additional description and detail of an embodiment of sheave 328 are provided below with reference to FIG. 11.

Figure 11:
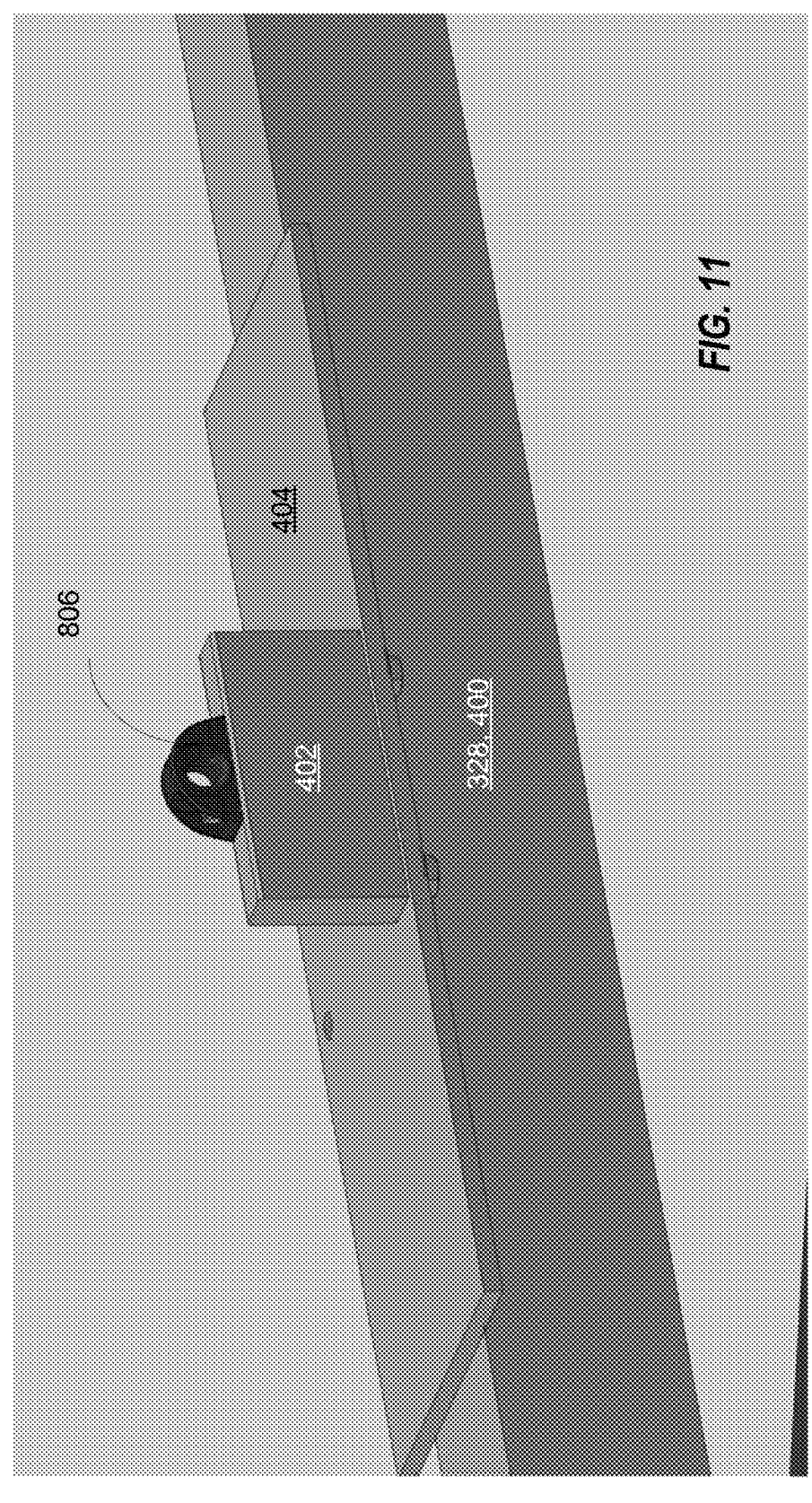
FIG. 11 is a close-up perspective view of an embodiment of a sheave mounted on the crown of sheave and bump stop, according to the present invention.

FIG. 11 is a close-up perspective view of an embodiment of a sheave 328 mounted on the crown 400 of sheave and bump stop 320, according to the present invention. Sheave 328 may be any suitable annular ring configured to receive a tow cable (not shown in FIG. 11, but, e.g., see 324 in FIG. 4) as long as the tow cable can slide freely through the sheave as the tow cable is under tension from the watercraft on one end, or the winch on the other end, or both. The sheave 328 may be mounted on a spacer block 402 which in turn is mounted on plate 404. It will be understood that in another contemplated embodiment the use of a spacer block 402 and plate 404 may be eliminated and the sheave 328 may be mounted directly to crown 400. It will be further understood that any suitable mounting mechanism for supporting sheave 328 may be employed with sheave and bump stop 320, according other contemplated embodiments of the present invention and that such other embodiments will be within the knowledge of one of ordinary skill in the art and thus will not be further elaborated herein.

Figure 4:
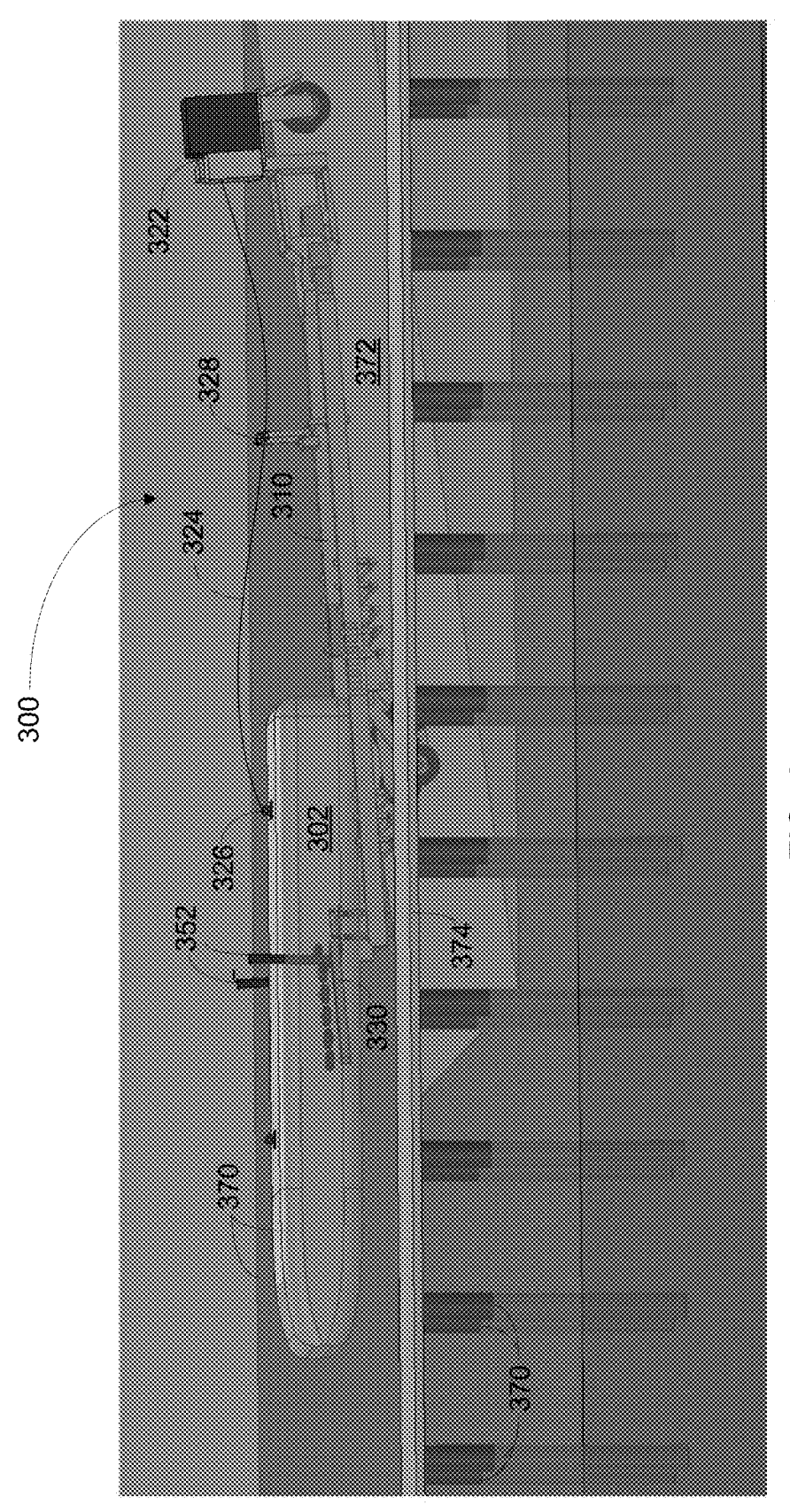
FIG. 4 is a right perspective view of the embodiment of system shown in FIG. 3, according to the present invention.

FIG. 4 is a right perspective view of the embodiment of system 300 shown in FIG. 3, according to the present invention. As shown in FIG. 4, system 300 may be largely submerged in water (see waterline 370) as it is maneuvered on and off of boat ramp 372. FIG. 4 illustrates a pier 374 in foreground which may also be the kind of structure that the UUV 302 could bump into during launch and recovery. FIG. 4 further illustrates the UUV 302 as it is partially loaded onto trailer 310 with a right guide rail 330 visible and both cable guide posts 352 extending vertically above the water. As shown in FIG. 4, tow cable 324 is connected between eyelet 326 on the UUV 302 and winch 322 and passes through sheave 328.

Figure 5:
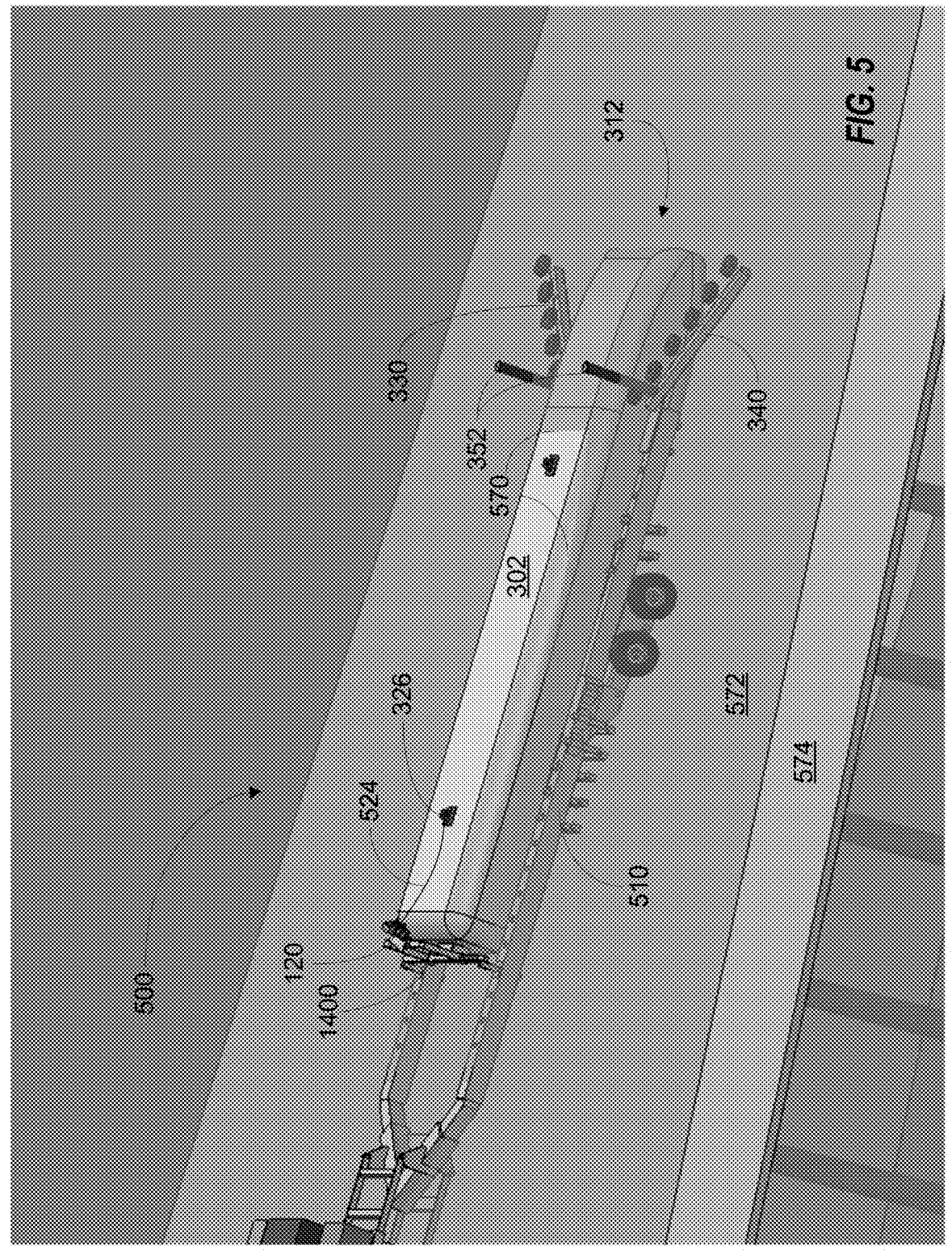
FIG. 5 is a left perspective view of another embodiment of a system for launch and recovery of a watercraft, according to the present invention.

FIG. 5 is a left perspective view of another embodiment of a system 500 for launch and recovery of a watercraft, according to the present invention. System 500 similar to the fixed rail embodiment of system 100 as it also has embodiments of fixed guide rails 330 and 340 and a winch and bump stop support 1400. As shown in FIG. 5, system 500 may be largely submerged in water (see waterline 570) as it is maneuvered on and off of boat ramp 572. FIG. 5 further illustrates a pier 574 in foreground. FIG. 5 illustrates the UUV 302 fully loaded onto trailer 510 with a right and left guide rails 330 and 340 in an open V-shaped configuration. As shown in FIG. 5, both cable guide posts 352 may extend vertically above the water and are used to keep the tow cable 524 within the open end 312 of trailer 510. The embodiment of system 500 shown in FIG. 5 illustrates tow cable 524 connected between one of the eyelets 326 on the UUV 302 and winch 120 mounted on the crown of winch and bump stop support 1400. Further description and detail regarding the embodiment of winch and bump stop support 1400 is disclosed below with reference to FIG. 14.

Figure 6A:
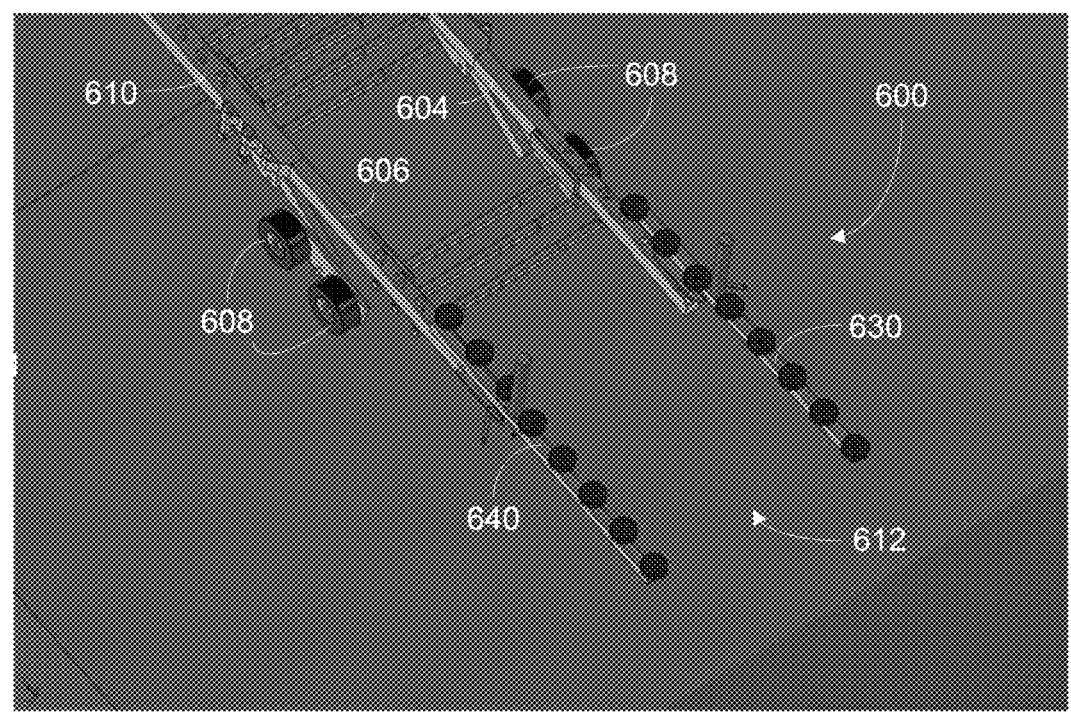
FIGS. 6A and 6B are perspective partial views of yet another embodiment of a rotating rail system for launch and recovery of a watercraft illustrated in closed and open configurations, respectively, according to the present invention.
Figure 6B:
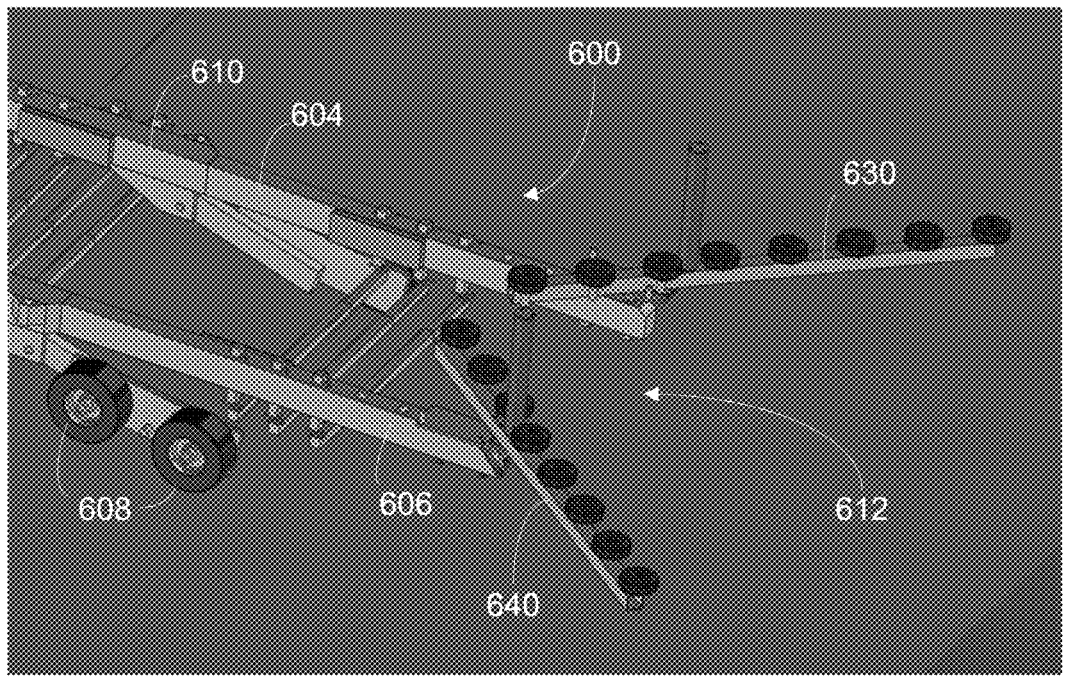

FIGS. 6A and 6B are perspective partial views of yet another embodiment of a rotating rail system 600 for launch and recovery of a watercraft illustrated in closed and open configurations, respectively, according to the present invention. Embodiments of system 600 may include a trailer 610 supported by wheels 608 and right 630 and left 640 rotating guide rails mounted on respective right 604 and left 606 longitudinal beams. FIG. 6A illustrates the closed configuration of trailer 610, where both rotating guide rails 630 and 640 are rotated to a longitudinal (parallel) configuration that when viewed from above shows rotating guide rails 630 and 640 each parallel with its respective beam 604 and 606 when viewed from above. FIG. 6B in contrast illustrates the open configuration of trailer 610, where both rotating guide rails 630 and 640 are rotated to a V-shaped configuration when viewed from above.

Figure 6C:
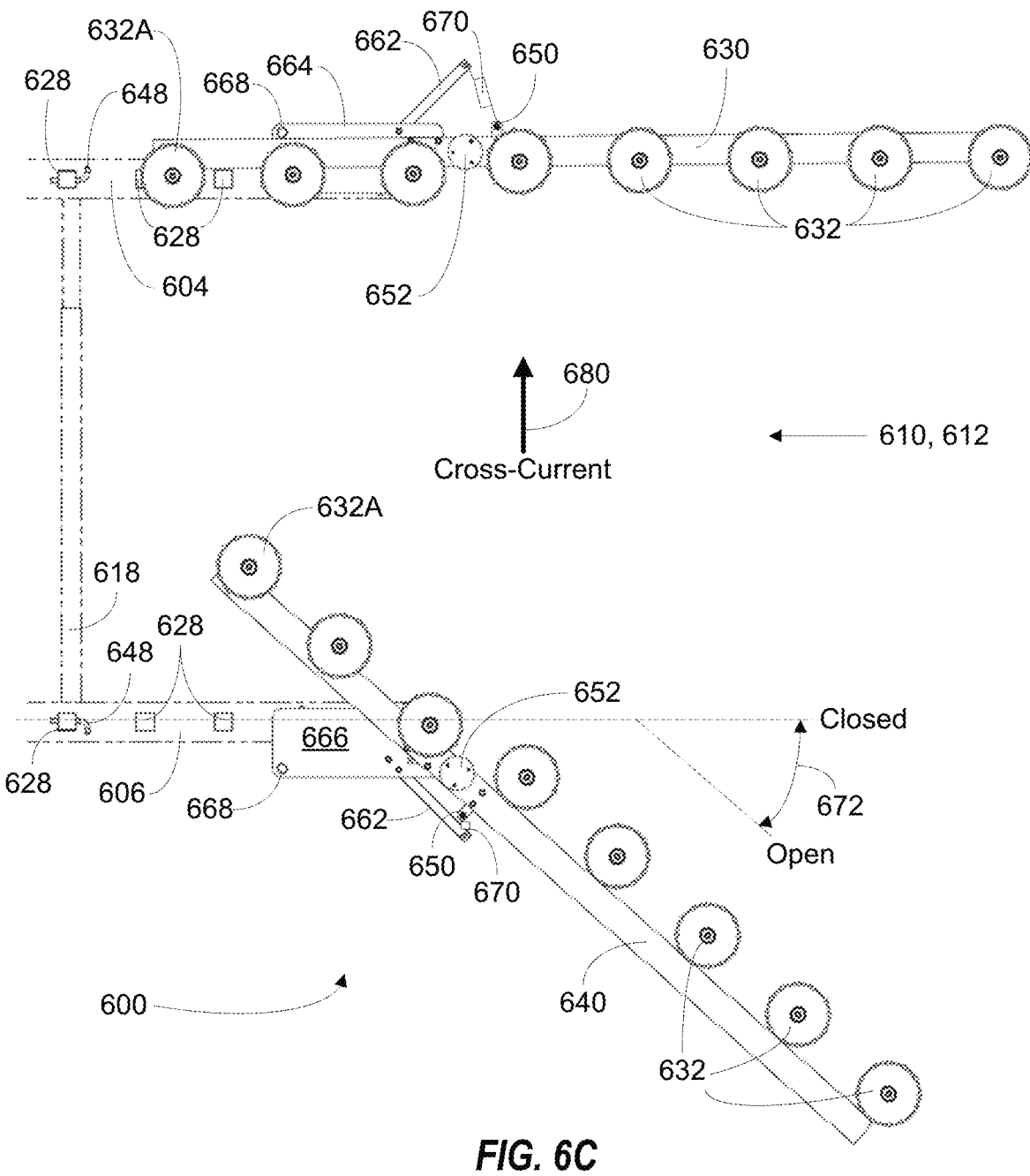
FIG. 6C is a top view of a portion of the embodiment of a rotating rail system for launch and recovery of a watercraft illustrated in FIGS. 6A and 6B.

FIG. 6C is a top view of a portion of the embodiment of a rotating rail system 600 for launch and recovery of a watercraft illustrated in FIGS. 6A and 6B. The portion of trailer 610, not shown completely in FIG. 6C, includes open end 612 with right 630 and left 640 rotating guide rails mounted on right 604 and left 606 longitudinal beams (shown in dot-dash lines). One of the laterally adjustable structural supports 618 is also shown extending perpendicularly between longitudinal beams 604 and 606. Support 618 is shown installed within accessory holes 628 disposed along longitudinal beams 604 and 606. Cotter pins 648 are used to secure opposite ends of support 618 within the accessory holes 628. Note that right rotating guide rail 630 is shown in a closed configuration, i.e., with its longitudinal axis generally parallel to the longitudinal axis of beam 604. This close configuration provides a more streamlined profile for transportation of the trailer 610, with or without a UUV (not shown in FIG. 6C) in its cradle and also for launch and recovery adjacent to a pier (not shown) on that side. Note further that left rotating guide rail 640 is shown in the open configuration (V-shaped with both rails open). The half-open/half-closed configuration illustrated in FIG. 6C is particularly useful during watercraft recovery operations under known cross-current, or wind loading environmental conditions. For example, a user of system 600 may configure the guide rails 630 and 640 for a cross-current, shown as bold arrow 680, directed generally perpendicularly toward a parallel-oriented rotating guide rail (in this instance guide rail 630) and leave the other guide rail (in this instance guide rail 640) in the open V-shaped configuration. This half-open, half-closed configuration of system 600 makes it easier to "catch" the watercraft (not shown) between rails 630 and 640 in a cross-current 680 and thereby guide the watercraft into the open end 612 of trailer 610.

Each embodiment of the rotating guide rails 630 and 640 may include a plurality of guide wheels 632 which may or may not be inflatable according to various embodiments, but that are configured to spin about their axes as a UUV (not shown) brushes up against them during launch or recovery. Each embodiment of the rotating guide rails 630 and 640 may further include a cable guide post 652 extending perpendicularly from its associated guide rail 630 and 640 and configured to maintain a tow cable (not shown) in between posts 652. Each embodiment of the rotating guide rails 630 and 640 may further include a perpendicular spring arm 650 extending from its respective guide rail 630 and 640. FIG. 6C further illustrates symmetrical right 664 and left 666 support plates disposed between right 604 and left 606 longitudinal beams, respectively, and right 630 and left 640 rotating guide rails, respectively. Embodiments of a right 664 and left 666 support plates may include an angled spring arm 662 and a closing pin 668. As shown in the illustrated embodiment of system 600, springs 670 may be employed between the angled spring arm 662 and the perpendicular spring arm 650 to bias guide rails 630 and 640 in the open V-shaped position. It will be understood that in the presence of a UUV (not shown in FIG. 6C) within the cradle of a trailer 610, the proximal guide wheels 632A are pushed toward their respective beams 604 and 606 thereby rotating guide rails 630 and 640 into the closed position by overcoming the bias in springs 670.

The intersecting dashed lines shown in FIG. 6C illustrate the arc of rotation, shown with double-headed arrow at 672, for the left rotating guide rail 640 between the open and closed positions at the end points of the arc 672. It will be understood that the right rotating guide rail 630 has a symmetrical arc of rotation (not illustrated in FIG. 6C). Embodiments of closing pins 668 may extend from the top surface of support plates 664 and 666 and may be configured to limit rotation of the guide rails 630 and 640 to the closed position thereby preventing over-rotation. It will be understood that counterpart open pins (not shown, but extending from the top surface of support plates 664 and 666 on opposing sides of guide rails 630 and 640, see FIG. 9 and related description herein) may be employed to limit open rotation of the guide rails 630 and 640, according to another embodiment of system 600. It will be further understood that other mechanisms may be employed to selectively lock the rotating guide rails 630 and 640 in the open or closed position may also be present in other contemplated embodiments of the present invention. Such mechanisms for selectively lock the guide rails will be well known to those of ordinary skill in the art and thus will not be further elaborated herein.

Figure 7:
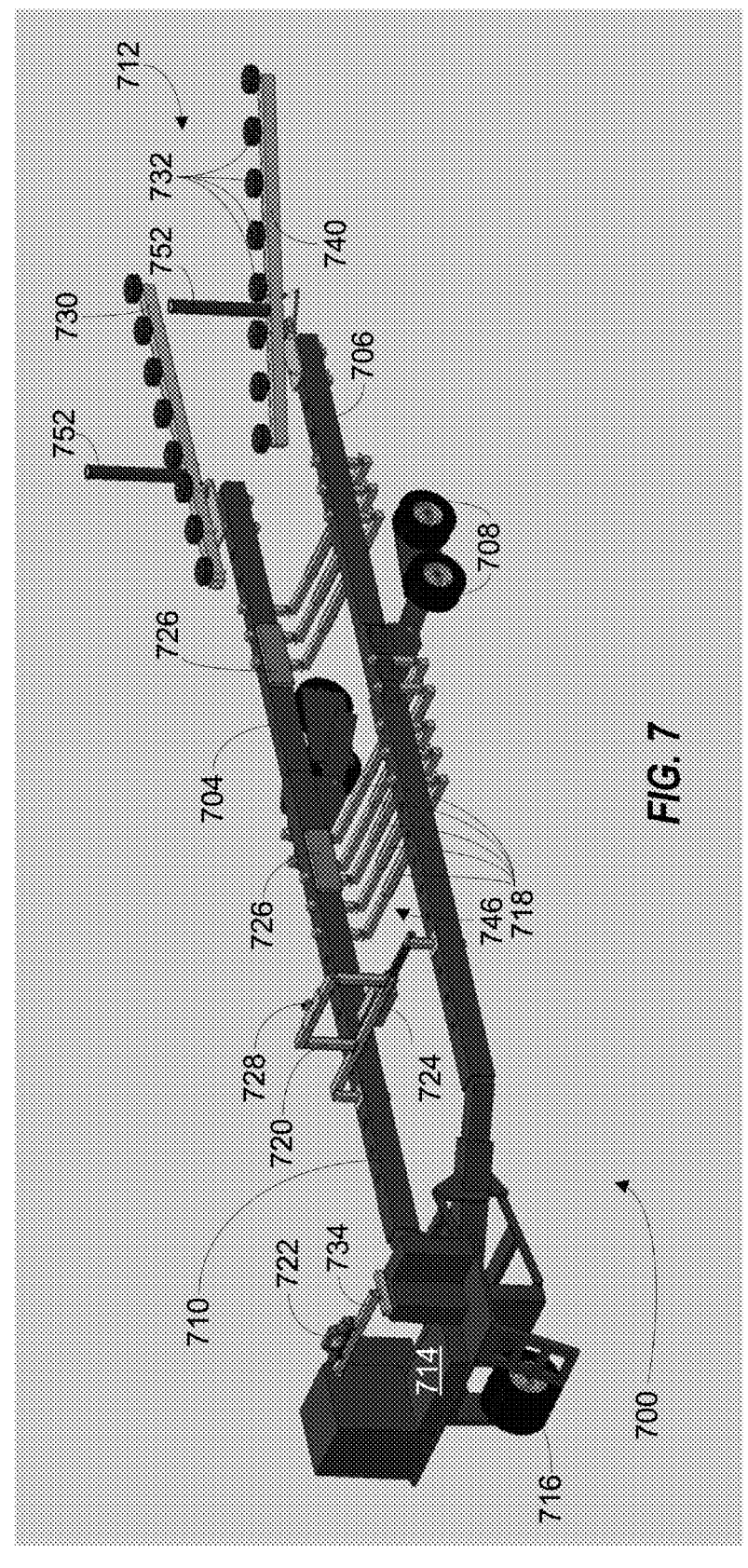
FIG. 7 is a perspective view of still another embodiment of a rotating rail system for launch and recovery of a watercraft, according to the present invention.

FIG. 7 is a complete perspective view of still another embodiment of a rotating rail system 700 for launch and recovery of a watercraft, according to the present invention. An embodiment of system 700 may include a trailer 710 having right 704 and left 706 longitudinal beams extending from a towing end 714 which may include a self-propelled fifth wheel 716. The embodiment of system 700 may further include an open end 712 having right 730 and left 740 rotating guide rails mounted to respective beams 704 and 706. The embodiment of system 700 may further include a cradle, shown generally at arrow 746, for supporting a watercraft (not shown). The cradle 746 may be defined on the bottom by laterally adjustable structural supports 718 (eight shown in FIG. 7) extending between beams 704 and 706, as well as the space located between beams 704 and 706.

The embodiment of system 700 may further include a sheave and bump stop support 720 extending between beams 704 and 706. The embodiment of a sheave and bump stop support 720 may include a sheave 728 for supporting a tow cable (not shown in FIG. 7). The embodiment of a sheave and bump stop support 720 may further include bump stop padding 728 for resting against an end of the watercraft (not shown) when fully loaded onto the cradle 746 of trailer 710. The embodiment of system 700 may further include a winch support 734 for supporting a winch 722 used with a tow cable (not shown for simplicity) to launch and recover the watercraft (not shown). Note that in the embodiment of system 700 shown in FIG. 7, the winch 722 is located at the towing end 714 of trailer 710 rather than mounted on the bump stop support 720 in place of the sheave 728. The embodiment of system 700 may further include padding 726 located on the inside of beams 704 and 706 for protection of the watercraft during transportation, launch and recovery within the cradle 746.

Figure 8:
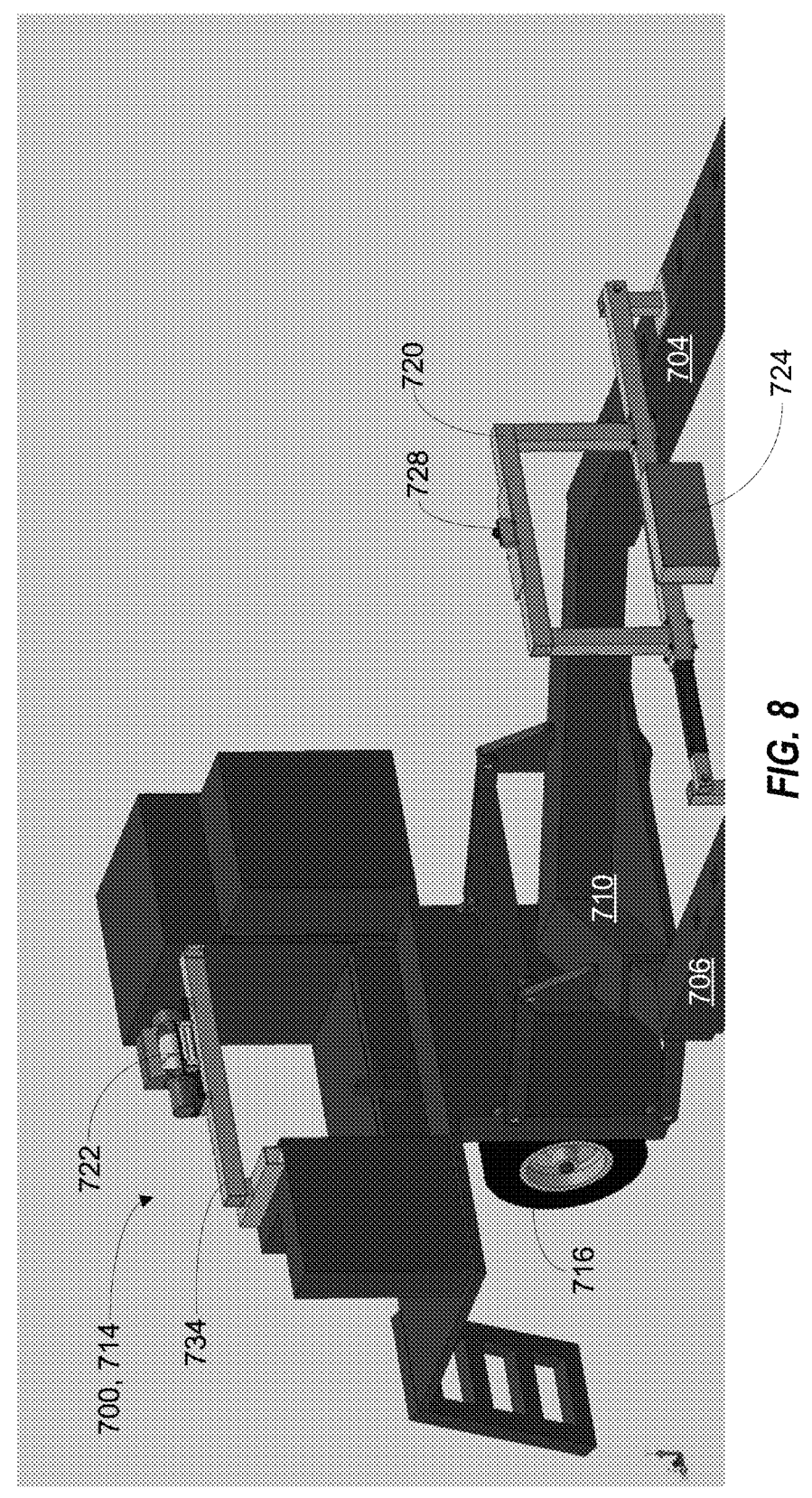
FIG. 8 is another perspective view of a portion of the embodiment of the system shown in FIG. 7.

FIG. 8 is another perspective view of a portion of the embodiment of the system 700 shown in FIG. 7. The view of system 700 shown in FIG. 8 illustrates a winch support 734 with winch 722 mounted on the towing end 714 of trailer 710. FIG. 8 further illustrates sheave and bump support 720 mounted between beams 704 and 706 supporting sheave 728 and padded bump stop 724. The towing end 714 of trailer 710 may be configured to host an operator (not shown) who can maneuver the self-propelled fifth wheel 716 to guide trailer 710 and also to operate the winch 722 and its associated tow cable (not shown) having one end connected to a watercraft (not shown).

Figure 9:
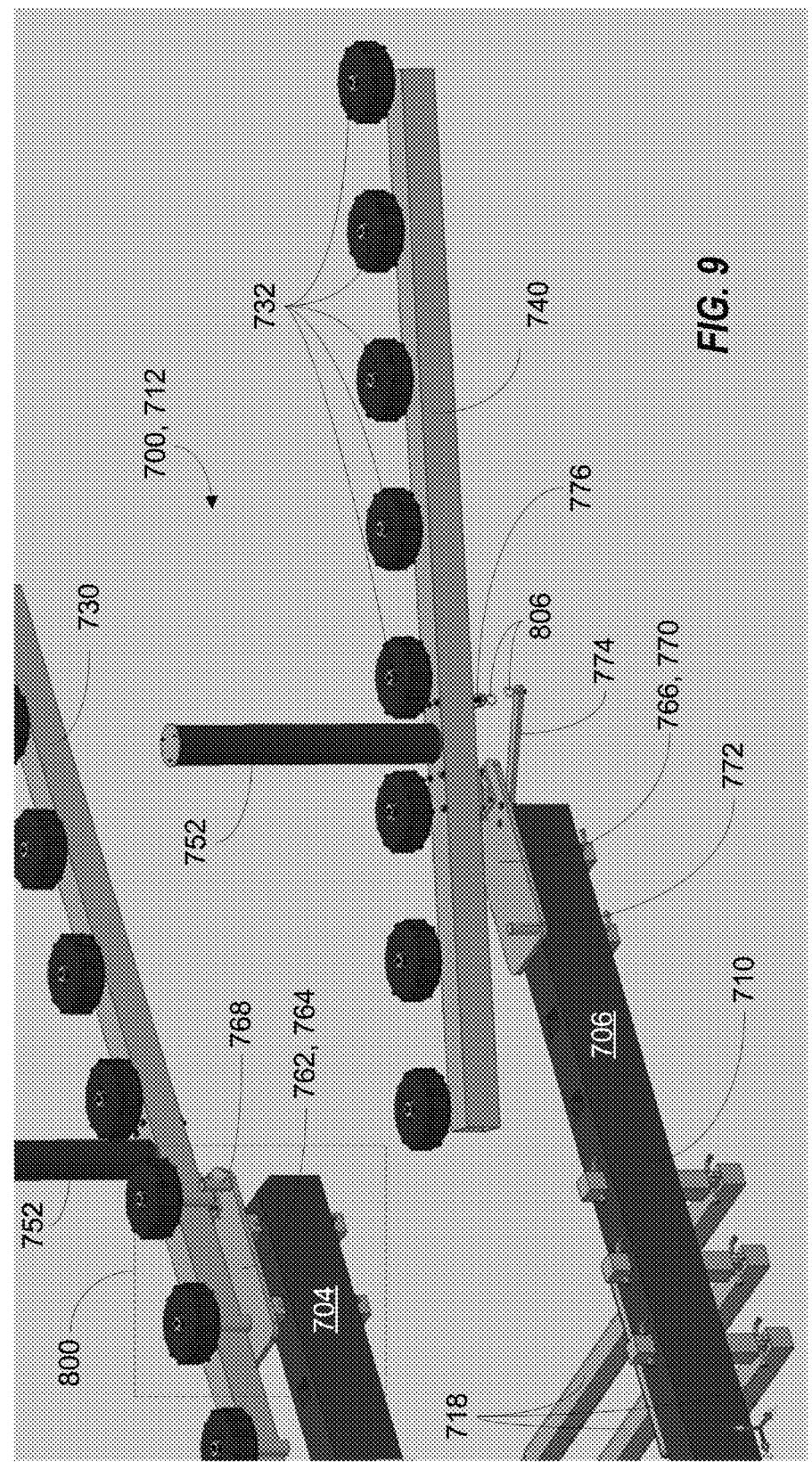
FIG. 9 is yet another perspective view of a portion of the embodiment of the system shown in FIGS. 7 and 8.

FIG. 9 is yet another perspective view of a portion of the embodiment of the system 700 shown in FIGS. 7 and 8. More particularly, FIG. 9 illustrates the open end 712 of the embodiment of system 700 with right 730 and left 740 rotating guide rails mounted to respective right 704 and left 706 longitudinal beams on trailer 710. Each guide rail 730 and 740 is shown with eight guide wheels 732 and one cable guide post 752 disposed thereon. The embodiment of system 700 further illustrates portions of three laterally adjustable structural supports 718 extending between right 704 and left 706 longitudinal beams.

Still more particularly, FIG. 9 illustrates right 764 support plate mounted between right rotating guide rail 730 and right longitudinal beam 704. The top surface 762 of right support plate 764 may further include an opening pin 768 extending perpendicularly therefrom and configured to interfere with rotation of right rotating guide rail 730 and establishing the fully opened position when resting against guide rail 730. Right rotating guide rail 730 is shown in the closed position. FIG. 9 further illustrates left 766 support plate mounted between left rotating guide rail 740 and left longitudinal beam 706. The top surface 770 of left support plate 766 may further include a closing pin 772 extending perpendicularly therefrom to interfere with rotation of left rotating guide rail 740 and establishing the fully open position.

Left rotating guide rail 740 is shown in the open position. The perspective view of system 700 shown in FIG. 9 further illustrates an angled spring arm 774 extending from the bottom surface of left support plate 766 and a perpendicular spring arm 776 extending perpendicularly from left rotating guide rail 740. Spring arms 774 and 776 each may include an eye bolt 806 at its distal end for attachment to opposite ends of a bias spring (not shown in FIG. 9 for simplicity). It will be understood that other mechanisms may be employed to secure ends of a bias spring to the spring arms 774 and 776 in accordance with the teachings of the present invention. Such other mechanisms will be known to those of ordinary skill in the art and thus, will not be further elaborated herein. As explained herein, the bias spring may be used to bias the guide rails 730 and 740 in the open position and the bias may be overcome by the presence of the watercraft on the trailer 710. Further description of the right mounting assembly, shown in dashed box 800, follows with reference to FIG. 10.

Figure 10:
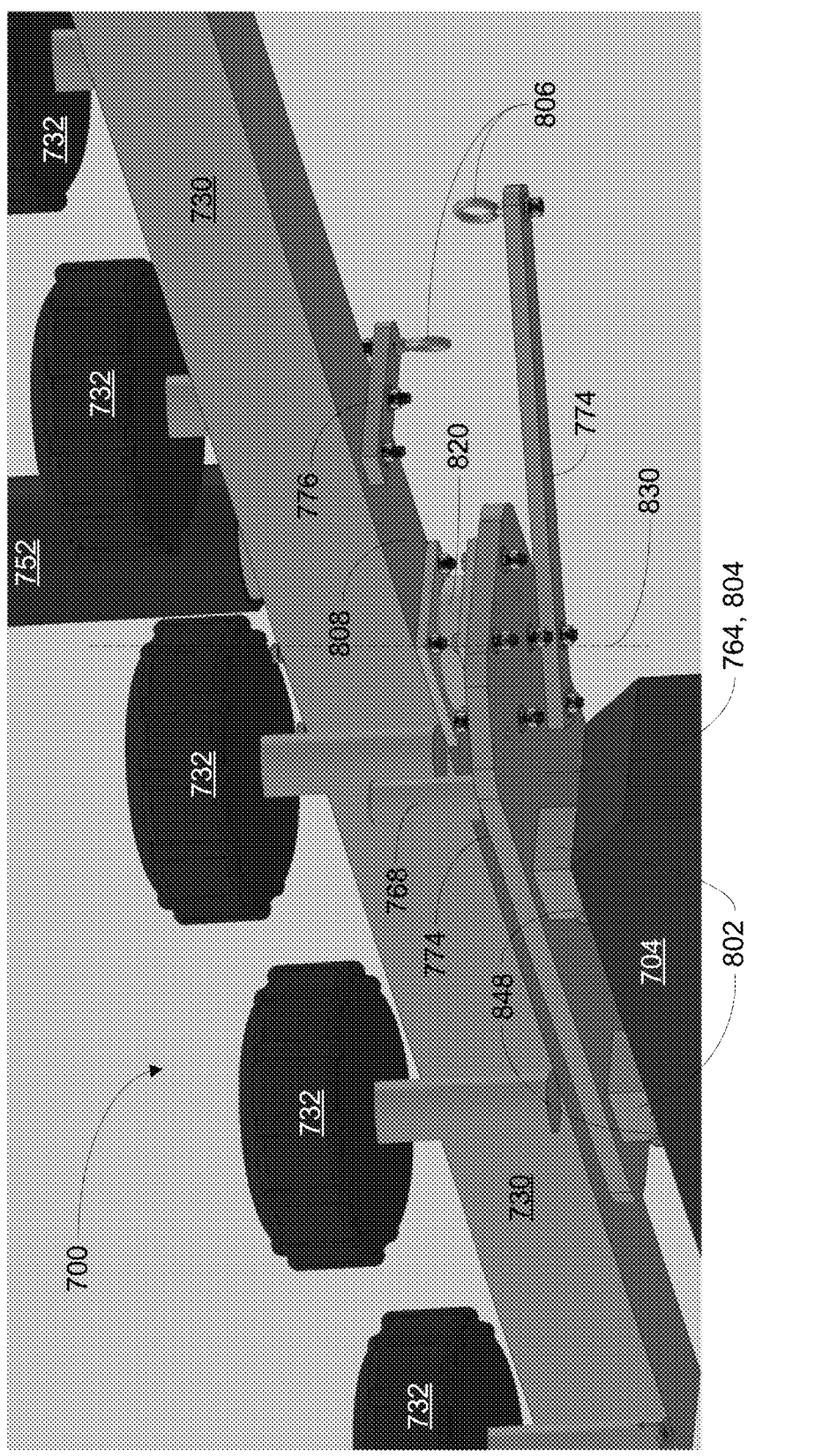
FIG. 10 illustrates a close-up perspective view of a right mounting assembly, according to the present invention.

FIG. 10 illustrates a close-up perspective view of a right mounting assembly 800 of system 700, according to the present invention. It will be understood that a symmetrical left mounting assembly is also present in system 700. Thus, description of a symmetrical left mounting assembly would be duplicative and unnecessary for understanding the present invention. More particularly, the illustrated embodiment of a right mounting assembly 800 shown in FIG. 10 may be mounted to the right longitudinal beam 704 via two mounting adapters 802 placed within accessory holes (not visible) formed in beam 704 and held vertically in place by cotter pins 848. Vertical adjustment of the right mounting assembly 800 may be achieved via a plurality of evenly spaced through holes disposed about the length of mounting adapters 802 that are configured to receive cotter pins 848 within. The mounting adapters 802 may be attached to the bottom surface 804 of right support plate 764 via welding or other means known to one of ordinary skill in the art. Angled spring arm 774 may be bolted to the bottom surface 804 at a proximal end and support an eye bolt 806 at a distal end.

The illustrated embodiment of a right mounting assembly 800 shown in FIG. 10 may further include a turntable 820 having rotation axis, shown at dashed line 830. Turntable 820 may be configured to rotationally mount right rotating guide rail 730 to a top surface 762 of right support plate 764 to a bottom surface 808 of right rotating guide rail 730. It will be understood that turntable 820 any suitable turntable could be used with the present invention. However, turntable 820 must be capable of supporting the weight of right rotating guide rail 730 and the forces exerted by a large watercraft during launch and recovery procedures. For example and not by way of limitation, turntable 820 may be an RMW Turntable Swivel Section, Part No. #T85-90RT-SL available from RWM Casters, 1225 Isley Dr, Gastonia, North Carolina 28052 USA. Turntable 820 may be bolted between guide rail 730 and plate 763 according to the illustrated embodiment. But, it will be understood that other suitable mechanisms for securing turntable 820 between guide rail 730 and plate 763 are contemplated to be within the scope of other embodiments of the present invention and will be readily apparent to one of ordinary skill in the art and thus will not be further elaborated herein.

The illustrated embodiment of right rotating guide rail 730 shown in FIG. 10 may further support a plurality of guide wheels 732 (five shown in the partial view) mounted to guide rail 730 at evenly spaced intervals and a cable guide post 752. Axial placement of the guide wheels 732 is not a critical feature of the present invention. However, the guide wheels 732 must be placed to engage the watercraft during launch and recovery. Accordingly, axial placement of the guide wheels 732 may fall on opposite sides of rotating right guide rail 730, as shown or even from the top surface (not shown) in another contemplated embodiment. An embodiment of a perpendicular spring arm 776 may also be attached to a bottom surface 808 of guide rail 730. It will be understood that perpendicular spring arm 776 may be bolted (as shown) at its proximal end to the bottom surface 808 (as shown) or any other suitable surface (not shown) of guide rail 730 or attached by welding (not shown) or any other suitable means or mechanism known to one of ordinary skill in the art and thus will not be further elaborated herein. The distal end of perpendicular spring arm 776 may also include an eye bolt 806. Though not shown for ease of illustration, it will be understood that a bias spring may be secured between the eye bolts 806 shown in FIG. 10 to bias the rotating right guide rail 730 in the open position as described herein. The illustrated embodiment of a right mounting assembly 800 may also include an opening pin 768 extending from the top surface 762 of right support plate 764. Though not shown in FIG. 10, a counterpart closing pin 772 may be mounted to the top surface 762 of right support plate 764 on an opposing side of guide rail 730. Opening pin 768 and closing pin 772 define the boundaries between the open and closed positions, respectively, of guide rail 730. According to one embodiment of right mounting assembly 800, pins 768 and 772 may located near diagonal corners of the top surface 762 of right support plate 764.

Figure 12:
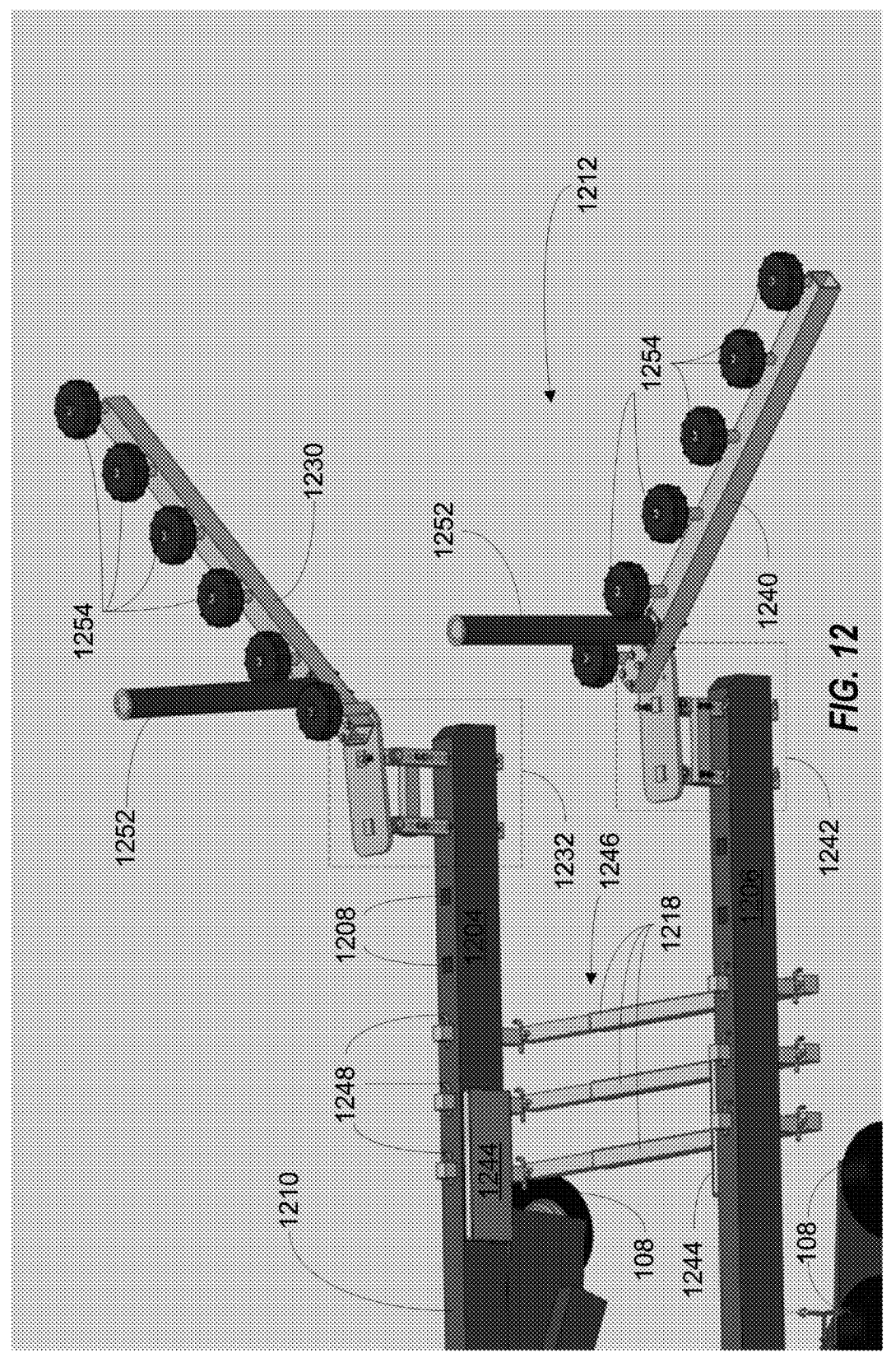
FIG. 12 illustrates a perspective view of an embodiment of fixed rail guide rails, according to the present invention.

FIG. 12 illustrates a perspective view of an embodiment of fixed guide rails 1230 and 1240 as installed on the open end 1212 of a trailer 1210, according to the present invention. More particularly, FIG. 12 illustrates an open end 1212 portion of an embodiment of a trailer 1210 used to launch and recover watercraft. The embodiment of a trailer 1210 may include a right longitudinal beam 1204 supported by wheels 108 (one partially shown underneath beam 1204) and a right mounting adapter assembly 1232 (in dashed box) supporting a fixed right guide rail 1230. The embodiment of a trailer 1210 illustrated in FIG. 12 may further include a left longitudinal beam 1206 supported by wheels 108 (two partially shown underneath beam 1206) and a left mounting adapter assembly 1242 (in dashed box) supporting a fixed left guide rail 1240.

FIG. 12 further illustrates three laterally adjustable structural supports 1218 that form the bottom of the cradle, shown generally at arrow 1246 used to carry the watercraft (not shown, but see UUV 102, FIGS. 1-2) located between the beams 1204 and 1206. According to various embodiments, padding 1244 may be disposed at various locations on the insides (cradle side) of beams 1204 and 1206 to protect the watercraft from hard surfaces that might damage the watercraft. It will be understood, and readily apparent from the illustrations in FIG. 12 that the inventive components of the present invention, e.g., the laterally adjustable structural supports 1218 and the right 1232 and left 1242 mounting adapter assemblies, are configured for easy installation and removal via accessory holes 1208 located in the beams 1204 and 1206 and cotter pins 1248 used to secure the components within the accessory holes 1208.

Embodiments of each fixed guide rail 1230 and 1240 may further include a plurality of guide wheels 1254 (six wheels 1254 shown on each guide rail 1230 and 1240 in FIG. 12) spaced along each guide rail 1230 and 1240 for safely guiding a watercraft in and out of the open end 1212 of trailer 1210. Embodiments of each fixed guide rail 1230 and 1240 may further include a vertically oriented cable guide post 1252 which is configured to maintain the tow cable (not shown in FIGS. 12 and 13) within the open end 1212 of the trailer 1210.

Figure 13:
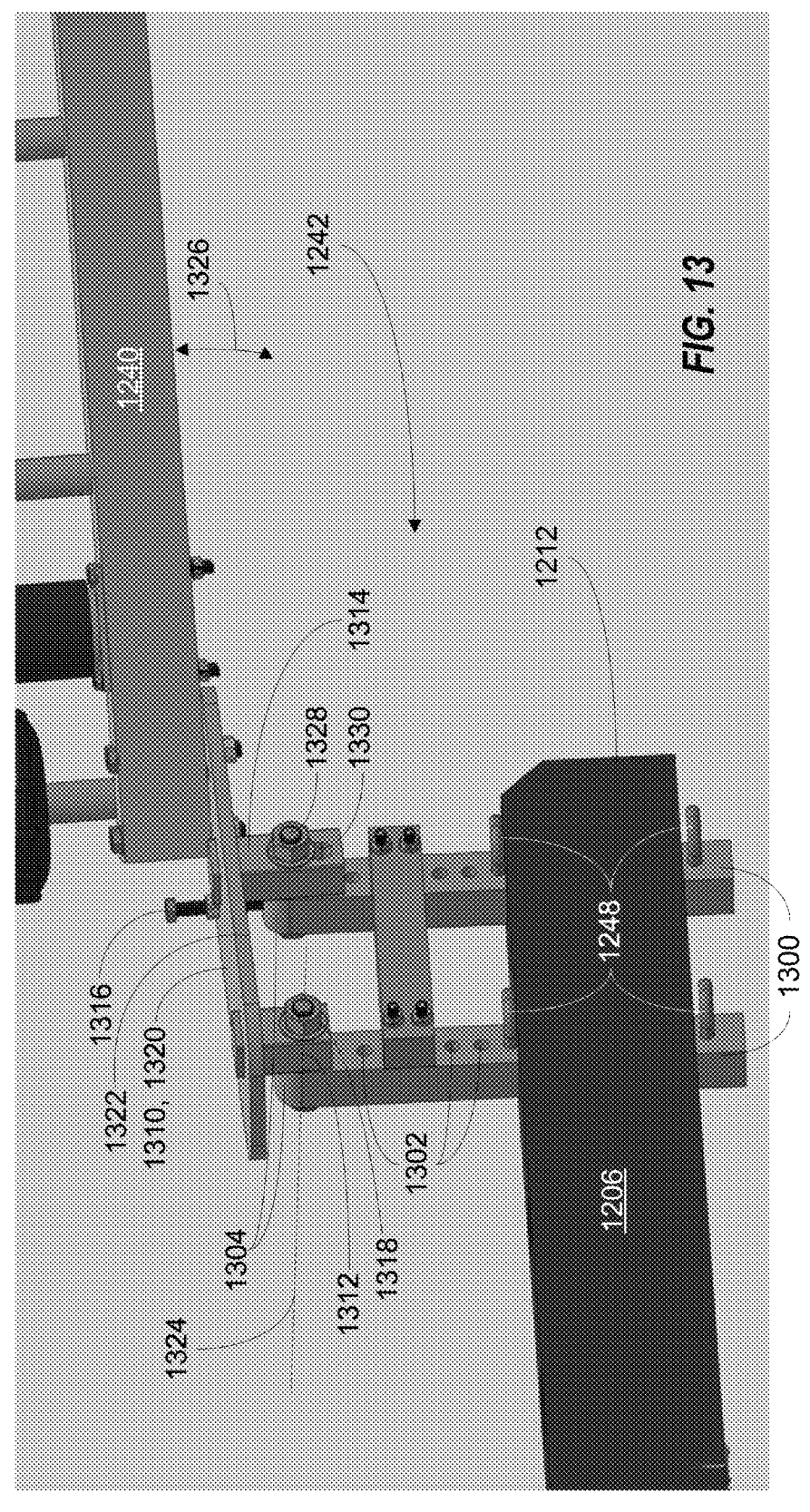
FIG. 13 illustrates a close-up perspective view of an embodiment of the left mounting adapter assembly shown in FIG. 12, according to the present invention.

FIG. 13 illustrates a close-up perspective view of the left mounting adapter assembly 1242 (see also, dashed box in FIG. 12) supporting the left fixed guide rail 1240 shown in FIG. 12. It will be understood that the right mounting adapter assembly 1232 is a mirror image of the left mounting adapter assembly 1242, and thus detailed description of only one assembly 1242 follows. The embodiment of a left mounting adapter assembly 1242 supports the fixed left guide rail 1240 on the open end 1212 of the left longitudinal beam 1206 via two accessory holes 1208 (not visible in FIG. 13) within beam 1206. The embodiment of a left mounting adapter assembly 1242 may include two mounting adapters 1300. The illustrated embodiments of mounting adapter 1300 may be square in cross-section and configured with a plurality of evenly-spaced through holes 1302 for use in selectively adjusting vertical position of fixed guide rail 1240 within accessory holes 1208 (not visible in FIG. 13) using cotter pins 1248. The illustrated embodiment of a mounting adapter 1300 may further be configured with a cylindrically rounded top 1304 and top mounting hole (not visible, but inherent in FIG. 13). Embodiments of mounting adapter 1300 may be formed of any suitable metal and construction capable of supporting the weight, torque and lateral forces applied by guide rail 1240 during use.

The embodiment of a left mounting adapter assembly 1242 may further include a left support plate 1310 including pivot bracket 1312 and slotted bracket 1314 extending from a bottom side and an optional set screw 1316 passing there through. The set screw 1316 may be configured to limit the downward tilt of fixed left guide rail 1240 permitted by slotted bracket 1314 by resting against the cylindrically rounded top 1304 of mounting adapter 1300. The embodiment of a left support plate 1310 may have a top surface 1320 and a bottom surface 1322. The embodiment of a pivot bracket 1312 may be connected to left support plate 1310 and extending from the bottom surface 1322 with a pivot bracket hole (not visible, but inherent in FIG. 13). According to the illustrated embodiment, left mounting adapter assembly 1242 may further include a pivot bolt 1318 configured for rotational connection between a mounting adapter 1300 via its top mounting hole (not visible, but inherent in FIG. 13) and pivot bracket 1312 and its pivot bracket hole (also not visible, but inherent in FIG. 13), thereby defining a tilt axis 1324 passing through pivot bolt 1318. The embodiment of a slotted bracket 1314 may also be connected to the left support plate 1310 and extending from the bottom surface 1322. The embodiment of a slotted bracket 1314 may be spaced apart from the pivot bracket 1312 and further include a curved slot hole 1330 for receiving a tilt bolt 1328.

It will be understood that a particularly useful feature of the mounting adapter assemblies 1232 and 1242 (FIG. 12) is the capability of independently tilting, see curved double arrow 1326 their respective guide rails 1230 and 1240 to compensate for boat ramp gradient to maintain relative horizontal orientation of the guide rails 1230 and 1240 during launch and recovery of a watercraft. The particular tilt angle may be set manually and locked via bolt 1328, or hydraulically actuated (not shown) and such methods of tilting are within the knowledge of one of ordinary skill in the art and thus will not be further elaborated herein. Tilt angle may also be limited by length of curved slot hole 1330. It will be further understood that the adjustable tilt and height features of the mounting adapter assembly 1242 shown in FIG. 13 may be employed on rotating rail embodiments and not just the fixed rail embodiment of FIG. 13.

FIG. 1 is a top view diagram of an embodiment of a rotating rail-based launch and recovery system 100 as it would be used to recover (and launch) a large UUV 102 from a boat ramp or any other suitable inclined water/ground interface, see dashed water line 170, according to the present invention. As shown in FIG. 1 the UUV 102 may be subject to drift under current or wind loading conditions making it more difficult to recover and pull onto system 100. Note that FIG. 1 is diagrammatic only and the objects shown therein may or may not be shown to relative or proportional sizes. System 100 has many features in common with system 200 that are detailed below for completeness.

System 100 may include a trailer 110 having two opposed longitudinal beams 104 and 106 which are in turn supported on the ground by a wheels 108 (4 shown in FIG. 1). Trailer 110 may further include an open end 112 and an opposed towing end 114. The open end 112 is configured to receive and release the UUV 102 from and into water, respectively. FIG. 1 further illustrates a dinghy 150 and ridged-hulled inflatable boat (RNIB) 160 that would be used during recovery of an UUV 102. The towing end 114 of trailer 110 may be configured with a conventional ball-hitch mounting mechanism (not shown), a semi-trailer hitch mechanism for rotational connection to a towing vehicle (also not shown), a hydraulic tongue for adjustable leveling (not shown but see, e.g., Kropf Conolift Marine Hydraulic Equipment Brochure, available from: Kropf Industrial Inc., 1 Quebec Drive, Seguin ON P2A 0B2), or a self-propelled hydraulic fifth wheel tug (not shown but see, e.g., Kropf Conolift, Haulle™ Trailer Tugs, also available from: Kropf Industrial Inc.) It will be understood that such conventional vehicle towing mechanisms are well-known to one of ordinary skill in the art and thus will not be further elaborated herein. The illustrated towing end 114 may be equipped with a self-propelled fifth wheel 116 for use at a ship yard or any other boat launch ramp.

System 100 may further include embodiments of laterally adjustable structural supports 118 used to cradle the UUV 102 from below when out of the water. According to a couple embodiments, the laterally adjustable structural supports 118 may be hollow rectangular cross-sectioned beams or nylon webbing and are configured to be adjustable in length to accommodate various widths of UUV 102 on the trailer 110 cradled between the longitudinal beams 104 and 106. The number and location of the supports 118 may be adjusted according to the size and weight requirements of the particular UUV 102, according embodiments of the present invention. Various rectangular cross-sectioned beam embodiments of the laterally adjustable structural supports 118 will be further described and shown herein.

System 100 may further include a raised winch and bump stop support 120 mounted between the longitudinal beams 104 and 106 at an appropriate location between the open end 112 and the towing end 114 of trailer 110. The bump stop support 120 may be configured with a winch 122 for connection to the winch end of a tow cable 124. The tow cable 124 is used to pull an UUV 102 toward the open end 112 of trailer 110 during recovery. The UUV end of the tow cable 124 may be secured to an eyelet 126 (two shown in FIG. 1) or tie-down point on the UUV 102. Further details of the winch and bump stop support 120 are shown in FIG. 14 and related description herein.

System 100 may further include right and left rotating guide rails 130 and 140 mounted on respective longitudinal beams 104 and 106 at the open end 112 of trailer 110. According to various embodiments, the rotating guide rails 130 and 140 may fixed in the open position or rotatable to open or closed positions. The rotating rails system embodiment 100 of trailer 110 illustrated in FIG. 1 allows the guide rails 130 and 140 to be configured in an open (V-shaped) position that is particularly useful during recovery of an UUV 102 and closed once the UUV is secured on the trailer 110. The rotating rails embodiment of system 100 shown in FIG. 1 allows for one or both guide rails 130 and 140 to be in an open position as well as in a closed position wherein the rotating guide rails 130 and 140 are oriented longitudinally with their respective longitudinal beams 104 and 106. Each rotating guide rail 130 and 140 may be equipped with a plurality (4 shown on each guide rail 130 and 140 in FIG.

1) of inflatable guide wheels 132 used to guide the UUV 102 in and out of the trailer 110. Additional features of the rotating guide rails 130 and 140 will be detailed below.

Referring now to FIG. 14, a perspective view of an embodiment of a winch and bump stop support 1400 is shown, according to the present invention. The illustrated embodiment of support 1400 may include two symmetrical vertical members 1402 (one shown on the right), each having an upper end 1404, a lower end 1406 and configured to slide vertically within accessory holes 1408 disposed within the longitudinal beams (right beam 104 shown). It will be understood that the vertical members 1402 are identical and/or symmetric, thus only requiring illustration of one. According to yet another embodiment, the vertical members 1402 may be configured with evenly spaced through holes (not shown) for use with cotter pins (also not shown) to selectively adjust the height of the winch 122. The illustrated embodiment of support 1400 may further include two hollow horizontal members 1410 and 1412, each having a cradle end 1410A and 1412A, respectively (1410A is within member 1412 and thus not visible), a beam end 1410B and 1412B, and a generally square cross-section. According to the illustrated embodiment of support 1400, the first of the two horizontal members 1410 may be dimensioned to slide within the second 1412 of the two horizontal members at respective cradle ends cradle ends 1410A (not shown) and 1412A to accommodate selective lateral spacing between the beams 104 and 106 (not shown). Each horizontal member beam end 1410B (not shown) and 1412B may be further configured to attach to a respective vertical member upper end 1404 (only one shown), according to the illustrated embodiment. Nuts and bolts (shown), or welding (not shown) or any other suitable connection mechanism or means known to one of skill in the art may be used to secure the horizontal members 1410 and 1412 to the vertical members 1402. According to a further feature of support 1400, the first hollow horizontal member 1410 may be configured with a surrounding plastic sleeve 1422 for ease of sliding within counterpart second hollow horizontal member 1412 and reduced friction from corrosion, with or without a lubricant during trailer width adjustment.

The illustrated embodiment of support 1400 may further include an inverted U-shaped frame 1414 having foot ends 1416 configured for attachment to the second horizontal member and a crown 1418 extending parallel to and above the second horizontal member 1412 for supporting the winch 122. Frame 1414 may be formed of hollow metal tubing having square cross-section and may be also be formed of straight sections of same that have been welded together in the perpendicular configuration illustrated in FIG. 14. The dimensions of frame 1414 may be of any width or height that allows for towing the UUV 102 from one or more of its eyelet 126, and to accommodate mounting to the second hollow horizontal member 1412 in two locations via foot ends 1416. Foot ends 1416 may include any suitable connectors known to those of skill in the art including, for example and not by way of limitation, welding, or the illustrated plates secured by nuts and bolts. The mounting of foot ends 1416 to the second hollow horizontal member 1412 may thus be permanent or selectively removable according to embodiments of the present invention. The illustrated embodiment of support 1400 may further include a padded bump stop 1430 mounted cradle-side on the second horizontal member 1412 and configured to rest against and protect the UUV 102 (not shown in FIG. 14) when fully winched in.

According to a couple embodiments of the present invention, winch 122 may be hand cranked (not shown) or electric as illustrated. For example and not by way of limitation, winch 122 may be a Patriot 6000, Part No. 109158, available from Ramsey Winch, 4707 N Mingo Rd, Tulsa, OK 74117 USA. According to an embodiment of support 1400, winch 122 may be mounted on crown 1418 and may be configured for rotation about a vertical axis 1424 (shown in dashed line) passing through the crown 1418 and one or both horizontal members 1410 and 1412. As shown in FIG. 14, the embodiment of support 1400 may further include a turntable 1420 mounted in between the crown 1418 and the winch 122. The turntable 1420 allows winch 122 to pivot in the direction of the tow cable 124 tension as it pulls in or reels out the UUV 102. This feature may reduce lateral strain on the winch 122 under adverse towing conditions. The turntable 1420 may be any suitable industrial turntable capable of mounting in between the crown 1418 and the winch 122. For example and not by way of limitation, turntable 1420 may be an RMW Turntable Swivel Section, Part No. #T85-90RT-SL available from RWM Casters, 1225 Isley Dr, Gastonia, North Carolina 28052 USA.

Referring again back to FIG. 1, an exemplary method of using the rotating rail launch and recovery system 100 for recovery of a UUV 102 using four personnel (P1-P4) and associated equipment will be explained. Person P1 configures the rotating guide rails 130 and 140 into the open position (shown) and drives the trailer 110 into the water from the boat ramp. Person P4 pilots the ridged hull inflatable boat (RHIB) 160 to maneuver the UUV 102 from within the water using tow cables 162 (two shown) each connected at one end to a winch 172 on the RHIB 160 (two shown) and to the eyelets 126 mounted on the UUV 102. Persons P2 and P3 on the RHIB operate the winches 172. Person P4 maneuvers the UUV 102 via the RHIB 160 to about 60' of the open end 112 of the trailer 110. Person 1 then paddles dinghy 150 to latch the tow cable 124 to an eyelet 126 on the UUV 102 while persons P2 and P3 control tension on tow cables 162 as necessary by hand or with winches 172. Person P1 secures the dinghy 150 once the tow cables 122 and 162 are in place on the UUV 102. Person P4 stationkeeps the UUV 102 using the RHIB 160 via its thrusters or anchoring the RHIB 160. Person P1 returns to the trailer 110 to operate winch 122 and control hydraulics on the trailer 110 during UUV 102 recovery. Persons P2-P4 control orientation of the UUV 102 as it is winched onto the trailer 110. As the UUV 102 is guided into the open end 112 of the trailer by the guide wheels 132 on each of the rotating guide rails 130 and 140, the guide rails 130 and 140 will reorient into the closed (parallel when viewed from above) position overcoming spring bias to the open position. Person P1 reels in the UUV 102 using winch 122. Once the UUV 102 is fully loaded in the cradle of the trailer 110, the tow cables 122 and 162 may then be released by person(s) P1 and/or P2 and P3 and secured. Person P1 may then drive the trailer 110 out of the water, onto the boat ramp, and transport to, its dry land destination (dry dock, over-the-road transport, etc.) Person P4 maneuvers the RHIB 160 away and secures the RHIB 160 for further use. It will be understood that many variations on this general method of using system 100 may be employed to recover a UUV 102 under adverse environmental conditions such as cross-currents and high-wind loading. Launching of an UUV 102 may be achieved by reversing the aforementioned steps, according to another embodiment of the present invention. Once loaded on the trailer 110 and secured, the UUV 102 may transported over the road or for storage in dry dock or elsewhere as desired.

A generic method for recovering a large UUV from water will now be described with reference to FIG. 15 and related description below.

Figure 15:
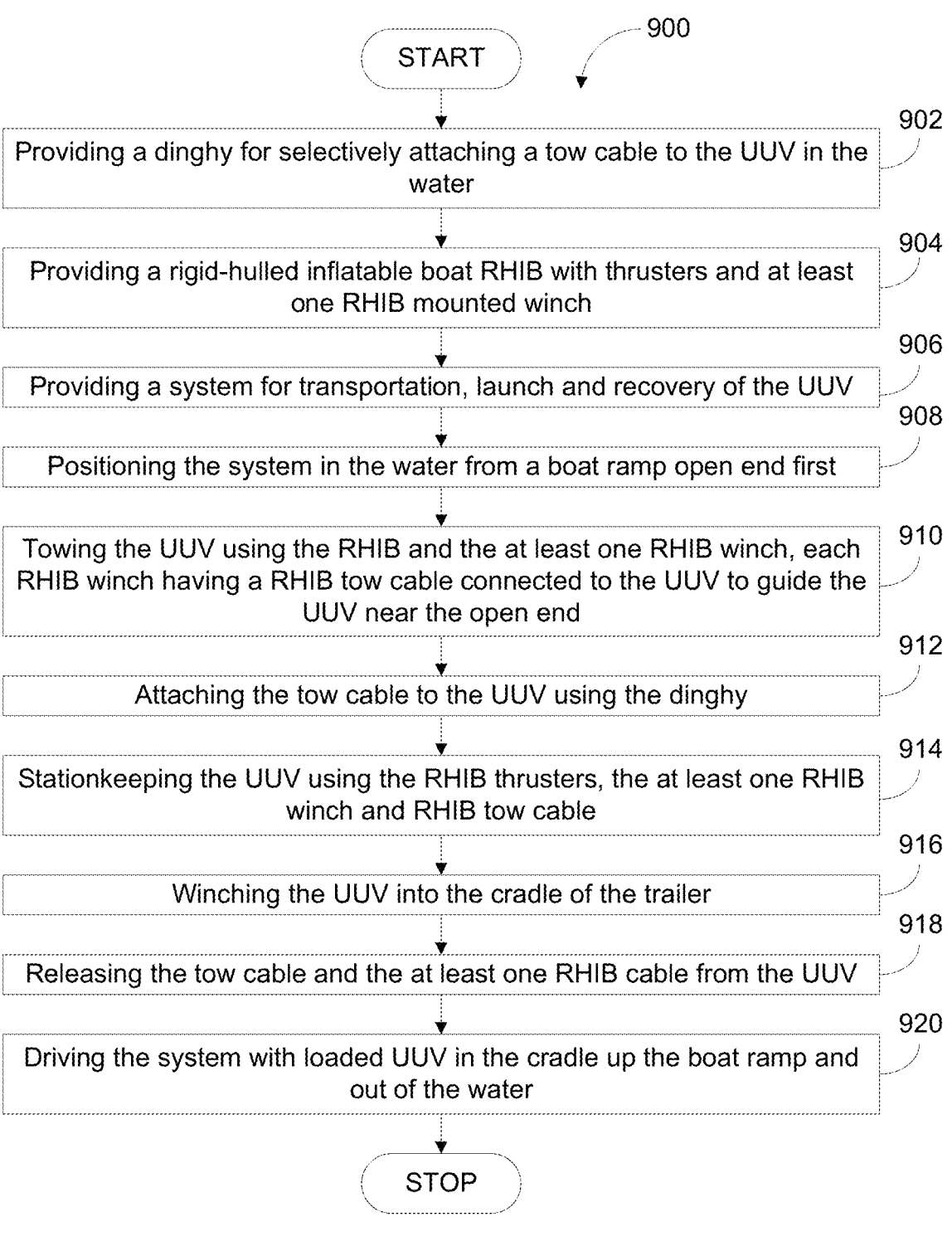
FIG. 15 is a flowchart of an embodiment of a method for recovering a large UUV from water, according to the present invention.

FIG. 15 is a flowchart of an embodiment of a method 900 for recovering a large UUV from water, according to the present invention. The embodiment of method 900 may include providing a dinghy 902 for selectively attaching a tow cable to the UUV in the water. The dinghy may be used by a user of the system for transportation, launch and recovery of the UUV to secure and remove a tow cable from the UUV as described herein. The dinghy may be dinghy 150 as shown in FIG. 1 and related discussion herein. The dinghy provided in step 902 may be used by a user of the system to secure and remove a tow cable as described herein. The embodiment of method 900 may further include providing a rigid-hulled inflatable boat (RHIB) 904 with thrusters and at least one RHIB mounted winch. The RHIB and RHIB mounted winch may be RHIB160 and RHIB winch 172, respectively, as shown in FIG. 1 and described herein. According to specific embodiments, the RHIB may include two RHIB winches 172, or just one.

The embodiment of method 900 may further include providing a system 906 for transportation, launch and recovery of the UUV. The system provided may be any of the various embodiments 100, 200, 300, 500, 600 and 700 and related components described herein. According to a particular embodiment, the system may include a trailer having an open end, a towing end opposite the open end, a right longitudinal beam and a left longitudinal beam. The system provided may further include the longitudinal beams extending between the ends. The longitudinal beams may be spaced apart from and parallel to one another thereby forming a cradle between the longitudinal beams configured to carry the UUV. According to a particular embodiment, the system may further include laterally and vertically adjustable support structures extending perpendicularly between and underneath the longitudinal beams to form a bottom of the cradle within trailer to support the UUV. According to a particular embodiment, the system may further include a winch located between the open and towing ends and configured to selectively reel a tow cable connected between the winch and the UUV. According to a particular embodiment, the system may further include left and right guide rails symmetrically mounted on respective beams at the open end configured to guide the UUV into and out of the cradle when submerged in water, the guide rails capable of orientation in an open V-shaped position when viewed from above. According to a particular embodiment, the guide rails may each further include perpendicularly extending cable guide posts configured to maintain the tow cable between the rails.

The embodiment of method 900 may further include positioning 908 the system in the water from a boat ramp open end first. The embodiment of method 900 may further include towing 910 the UUV using the RHIB and the at least one RHIB winch. According a one embodiment, each RHIB winch may be configured with a RHIB tow cable configured to be connected to the UUV to guide the UUV near the open end. The embodiment of method 900 may further include attaching the tow cable to the UUV 912 using the dinghy. The embodiment of method 900 may further include stationkeeping the UUV 914 using the RHIB thrusters, the at least one RHIB winch and the at least one RHIB tow cable. The stationkeeping step 914 is particularly useful in keeping the UUV aligned with open end of the trailer during adverse environmental conditions such as cross-currents and high-wind loading forces acting on the UUV during launch and recovery. The embodiment of method 900 may further include winching the UUV 916 into the cradle of the trailer. The embodiment of method 900 may further include releasing 918 the tow cable and the at least one RHIB cable from the UUV. The embodiment of method 900 may further include driving the system 920 with loaded UUV in the cradle up the boat ramp and out of the water. It will be understood that an embodiment of a generic method of launching a large UUV may generally be achieved by reversing the method 900 steps shown in FIG. 15.

Having described particular embodiments of the system, method and kit for transportation, launch and recovery of a large UUV with reference to the drawing FIGS., additional generic embodiments of the present invention will now be described. An embodiment of a system for transportation, launch and recovery of watercraft is disclosed. The embodiment of a system may include a trailer having an open end and a towing end opposite the open end. The embodiment of a trailer may further include a right longitudinal beam and a left longitudinal beam, wherein the right and left longitudinal beams extend between the ends. The embodiment of the right and left longitudinal beams may be spaced apart from and parallel to one another thereby forming a cradle between the beams configured to carry the watercraft. The embodiment of a system may further include laterally and vertically adjustable support structures extending perpendicularly between and underneath the right and left longitudinal beams to form a bottom of the cradle. The embodiment of a system may further include a winch located between the open and towing ends and configured to selectively reel a tow cable connected between the winch and the watercraft. The embodiment of a system may further include right and left guide rails symmetrically mounted on respective left and right longitudinal beams at the open end. The embodiments of right and left guide rails may be configured to guide the watercraft into and out of the cradle when submerged in water. The embodiments of right and left guide rails may further be capable of orientation in an open V-shaped position when viewed from above. The embodiments of right and left guide rails may further include perpendicularly extending cable guide posts configured to maintain the tow cable between the rails.

According to another embodiment of the system, each of the laterally and vertically adjustable support structures may further include two hollow horizontal members each having a cradle end, a beam end and a square cross-section. According to a particular embodiment, one of the two horizontal members may be dimensioned to slide within the other at respective cradle ends to accommodate selective lateral spacing between the beams. According to the particular embodiment, each horizontal member may further include a horizontal connector at the beam end. According to the particular embodiment, each of the laterally and vertically adjustable support structures may further include two vertical members, each configured to slide vertically within accessory holes disposed within the beams. Embodiments of each of the two vertical members may further include a vertical connector at a vertical bottom end for selectively mating with a respective horizontal connector. Embodiments of each of the two vertical members may further include a plurality of evenly spaced through holes along a length of the vertical member configured to receive a cotter pin configured to selectively adjust the cradle vertical distance from the beams.

According to another embodiment, the system may further include a winch and bump stop support. Embodiments of the winch and bump stop support may include two vertical members. Embodiments of each vertical member may include an upper end and a lower end. Embodiments of each of the vertical members may further be configured to slide vertically within accessory holes disposed within the longitudinal beams. According to particular embodiments, the lower end of each of the vertical members may be configured to be secured within an accessory hole within one of the longitudinal beams. Embodiments of the winch and bump stop support may further include two hollow horizontal members each having a cradle end, a beam end and a square cross-section. According to a particular embodiment, a first of the two horizontal members may be dimensioned to slide within a second of the two horizontal members at respective cradle ends to accommodate selective lateral spacing between the beams. According to a particular embodiment, each horizontal member beam end may further be selectively secured to a respective one of the two vertical member upper ends. Embodiments of the winch and bump stop support may further include an inverted U-shaped frame having foot ends configured for attachment to the second horizontal member and a crown extending parallel to and above the second horizontal member, wherein the frame may be configured for supporting the winch.

According to another embodiment of the system, the winch may be mounted on the crown and may further be configured for rotation about a vertical axis passing through the crown and the two horizontal members. According to still another embodiment of the system, the winch and bump stop may further include a padded bump stop mounted cradle-side on the second horizontal member. An embodiment of the padded bump stop may further be configured to rest against and protect the watercraft when fully winched in.

According to one embodiment of the system, each of the left and the right guide rails may include a mounting adapter assembly. An embodiment of the mounting adapter assembly may include two mounting adapters, each of the adapters configured for mounting within adjacent accessory holes disposed along the longitudinal beams. The embodiment of the mounting adapter assembly may further include a support plate attached to the two mounting adapters. The embodiments of the mounting adapter assembly may further be configured with a guide rail mounted to the support plate. Each embodiment of a guide rail may be configured with a plurality of guide wheels spaced along the guide rail. Embodiments of each guide wheel may be configured to rotate about its axis when the watercraft slides against the guide wheel during launch and recovery. One embodiment of the mounting adapter assembly may further include a stiffener bar mounted between the two mounting adapters. According to still yet another embodiment of the system, each of the cable guide posts extend vertically from each of the guide rails.

According to one embodiment, the system may further include a turntable connected between the support plate and the guide rail allowing the guide rail to rotate relative to the support plate. According to another particular embodiment of the system, each guide rail may be configured to selectively rotate about the turntable between the open V-shaped position during launch and recovery and a closed longitudinal position during transportation. According to yet another embodiment of the system, the right and the left guide rails may be oriented in a half open, half-closed configuration for recovering the watercraft during known cross-current conditions. According to another embodiment of the system, each guide rail may be configured to selectively tilt up at a distal end to compensate for ramp angle, thereby keeping each guide rail parallel with water level.

According to yet another embodiment of the system, each of the support plates may further include an opening pin and a closing pin disposed on a top surface of the support plate. Embodiments of each of the two pins may be located on opposing sides of its respective guide rail and configured to limit rotation of the respective guide rail within the open and closed positions.

According to still another embodiment of the system, each of the two mounting adapters may further include a plurality of evenly-spaced through holes for use in selectively adjusting vertical position of the guide rails relative to a beam upon which it is mounted. According to still yet another embodiment of the system, each of the two mounting adapters may further comprises a cylindrically rounded top having a pivot hole passing there through. According to one embodiment, the system may further comprise a spring biasing mechanism for maintaining the open V-shaped position when the watercraft is not inside the open end of the trailer. According to another embodiment, the watercraft may be a large unmanned underwater vehicle (UUV).

According to another embodiment of the system, each of the support plates may further include a pivot bracket extending from a bottom side of the support plate. The embodiment of a pivot bracket may include a pivot bracket hole passing through the pivot bracket. According to this embodiment of the system, each of the support plates may further include a pivot bolt configured for rotationally engaging a first of two mounting adapters by passing through the pivot hole of the first of the two mounting adapters and the pivot bracket hole, thereby defining a tilt axis. According to this embodiment of the system, each of the support plates may further include a slotted bracket extending from the bottom side of the support plate and spaced apart from the pivot bracket. This embodiment of a slotted bracket may further include a curved slot hole passing through the slotted bracket. According to this embodiment of the system, each of the support plates may further include a slot bolt configured for slotted engagement within the curved slot hole when mounted to the pivot hole of a second of the two mounting adapters. According to a general embodiment of the system, each of the mounting adapter assemblies may allow its respective guide rail to tilt about a tilt axis thereby compensating for boat ramp grade and maintaining horizontal orientation of its respective guide rail during launch and recovery.

An embodiment of a kit configured for converting a large watercraft trailer for use in transportation, launch and recovery of a large UUV is disclosed. The embodiment of a trailer may have an open end and a towing end opposite the open end. The embodiment of a trailer may further include a right longitudinal beam and a left longitudinal beam. Embodiments of the longitudinal beams may extend between the open and towing ends and are configured with accessory holes. Embodiments of the longitudinal beams may be spaced apart from, and parallel to, one another thereby forming a cradle between the beams configured to carry the UUV. It will be further understood that any suitable commercially available trailers having open and towing ends, right and left longitudinal beams with accessory holes could be adapted for use with the kit embodiments disclosed herein. For example and not by way of limitation, the Conolift™ ORT-20™ and OTR-30™ marine trailers available from available from Kropf Industrial Inc., 1 Quebec Drive, Seguin ON P2A 0B2, are particularly suitable for use with the kit embodiments disclosed herein.

An embodiment of the kit may include laterally and vertically adjustable support structures extending perpendicularly between and underneath the longitudinal beams. Embodiments of the laterally and vertically adjustable support structures may be mounted to the accessory holes and form a bottom of the cradle in which the UUV rests during transportation. The embodiment of the kit may further include a winch with a tow cable, the winch located between the open and the towing ends and configured to selectively reel the tow cable connected between the winch and the UUV. The embodiment of the kit may further include left and right guide rails symmetrically mounted on respective beams at the open end configured to guide the UUV into and out of the cradle when submerged in water. Embodiments of the guide rails may be capable of orientation in an open V-shaped position when viewed from above. Embodiments of the guide rails may each further include perpendicularly extending cable guide posts configured to maintain the tow cable within the open end of the trailer.

According to another embodiment of the kit, each of the left and right guide rails may further include a mounting adapter assembly. Embodiments of the mounting adapter assembly may include two mounting adapters, each of the adapters configured for mounting within adjacent accessory holes disposed along the longitudinal beams. Embodiments of the mounting adapter assembly may further include a support plate attached to the two mounting adapters. Embodiments of the mounting adapter assembly may further be configured to receive a guide rail mounted to the support plate. Embodiments of each guide rail may be configured with a plurality of guide wheels spaced along the guide rail. Embodiments of each guide wheel may be configured to rotate about its axis when the UUV slides against the guide wheel during launch and recovery.

According to yet another embodiment of the kit, each of the support plates may further include a pivot bracket extending from a bottom side of the support plate. An embodiment of the pivot bracket may include a pivot bracket hole passing through the pivot bracket. According to this embodiment of the kit, each of the support plates may further include a pivot bolt configured for rotational engagement by passing through the pivot hole of a first of the two mounting adapters and the pivot bracket hole, thereby defining a tilt axis. According to this embodiment of the kit, each of the support plates may further include a slotted bracket extending from the bottom side of the support plate and spaced apart from the pivot bracket. The embodiment of the slotted bracket may including a curved slot hole passing through the slotted bracket. According to this embodiment of the kit, each of the support plates may further include a slot bolt configured for slotted engagement within the curved slot hole when mounted to the pivot hole of a second of the two mounting adapters. According to still another embodiment of the kit, each of the mounting adapter assemblies allows its respective guide rail to tilt about a tilt axis thereby compensating for boat ramp grade and maintaining horizontal orientation of its respective guide rail during launch and recovery.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the system and method embodiments for transportation, launch and recovery of watercraft, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A system for transportation, launch and recovery of watercraft, the system including a trailer having an open end, a towing end opposite the open end, a right longitudinal beam, a left longitudinal beam, wherein the beams extend between the ends, the beams spaced apart from and parallel to one another thereby forming a cradle between the beams configured to carry the watercraft, the system further comprising:

laterally and vertically adjustable support structures extending perpendicularly between and underneath the beams to form a bottom of the cradle, wherein each of the laterally and vertically adjustable support structures further comprise:

two hollow horizontal members each having a cradle end, a beam end and a square cross-section, one of the two horizontal members is dimensioned to slide within the other at respective cradle ends to accommodate selective lateral spacing between the beams, each horizontal member further having a horizontal connector at the beam end; and two vertical members, each configured to slide vertically within accessory holes disposed within the beams, a vertical connector at a vertical bottom end for selectively mating with a respective horizontal connector and a plurality of evenly spaced through holes along a length of the vertical member configured to receive a cotter pin to selectively adjust the cradle vertical distance from the beams;

a winch located between the open and the towing ends and configured to selectively reel a tow cable connected between the winch and the watercraft;

right and left guide rails symmetrically mounted on respective beams at the open end configured to guide the watercraft into and out of the cradle when submerged in water, the guide rails capable of orientation in an open V-shaped position when viewed from above; and the guide rails each further comprising perpendicularly extending cable guide posts configured to maintain the tow cable between the rails.

2. The system according to claim 1, further comprising a winch and bump stop support, the winch and bump stop support comprising:

two vertical members, each having an upper end and a lower end and configured to slide vertically within accessory holes disposed within the beams, the lower end configured to be secured within an accessory hole within one of the beams;

two hollow horizontal members each having a cradle end, a beam end and a square cross-section, a first of the two horizontal members is dimensioned to slide within a second of the two horizontal members at respective cradle ends to accommodate selective lateral spacing between the beams, each horizontal member beam end further configured to be selectively secured to a respective one of the two vertical member upper ends; and an inverted U-shaped frame having foot ends configured for attachment to the second horizontal member and a crown extending parallel to and above the second horizontal member, the frame configured for supporting the winch.

3. The system according to claim 2, wherein the winch is mounted on the crown and is configured for rotation about a vertical axis passing through the crown and the two horizontal members.

4. The system according to claim 2, wherein the winch and bump stop further comprises a padded bump stop mounted cradle-side on the second horizontal member and configured to rest against and protect the watercraft when fully winched in.

5. The system according to claim 1, wherein each of the right and left guide rails further includes a mounting adapter assembly, comprising:

two mounting adapters, each of the adapters configured for mounting within adjacent accessory holes disposed along the beams; and a support plate attached to the two mounting adapters.

6. The system according to claim 5, further comprising a stiffener bar mounted between the two mounting adapters.

7. The system according to claim 5, further comprising a turntable connected between the support plate and the guide rail allowing the guide rail to rotate relative to the support plate.

8. The system according to claim 7, wherein each guide rail is configured to selectively rotate about the turntable between the open V-shaped position during launch and recovery and a closed longitudinal position during transportation.

9. The system according to claim 7, wherein the right and the left guide rails are oriented in a half open, half-closed configuration for recovering the watercraft during known cross-current conditions.

10. The system according to claim 5, wherein each guide rail is configured to selectively tilt up at a distal end relative to the longitudinal beams to compensate for ramp angle, thereby maintaining each guide rail parallel with water level.

11. The system according to claim 5, wherein each of the support plates further comprises an opening pin and a closing pin each of the pins extending from a top surface of the support plate, each of the two pins located on opposing sides of its a respective guide rail and configured to limit rotation of the respective guide rail within the open position and a closed position.

12. The system according to claim 5, wherein each of the two mounting adapters further comprises a plurality of evenly-spaced through holes for use with cotter pins in selectively adjusting a vertical position of the guide rail relative to the respective beam upon which the guide rail is mounted.

13. The system according to claim 5, wherein each of the two mounting adapters further comprises a cylindrically rounded top having a pivot hole passing there through.

14. The system according to claim 5, wherein each of the support plates further comprises:

a pivot bracket extending from a bottom side of the support plate, the pivot bracket including a pivot bracket hole passing through the pivot bracket;

a pivot bolt configured for rotationally engaging a first of two mounting adapters by passing through the pivot hole of the first of the two mounting adapters and the pivot bracket hole, thereby defining a tilt axis;

a slotted bracket extending from the bottom side of the support plate and spaced apart from the pivot bracket, the slotted bracket including a curved slot hole passing through the slotted bracket; and a slot bolt configured for slotted engagement within the curved slot hole when mounted to the pivot hole of a second of the two mounting adapters.

15. The system according to claim 5, wherein each of the mounting adapter assemblies allows the respective guide rail to tilt about a tilt axis thereby compensating for boat ramp grade and maintaining horizontal orientation of the respective guide rail during launch and recovery.

16. The system according to claim 5, further comprising a spring biasing mechanism for maintaining the open V-shaped position when the watercraft is not inside the open end of the trailer.

17. The system according to claim 1, wherein each of the cable guide posts extend vertically from each of the guide rails.

18. The system according to claim 1, wherein the watercraft comprises a large unmanned underwater vehicle (UUV).

19. The system according to claim 1, wherein each guide rail is configured with a plurality of guide wheels spaced apart along the guide rails, each guide wheel configured to rotate about an axis of the guide wheel when the watercraft slides against the guide wheel during launch and recovery.

20. A kit configured for converting a large watercraft trailer for use in transportation, launch and recovery of a large unmanned underwater vehicle (UUV) the trailer having an open end, a towing end opposite the open end, a right longitudinal beam, a left longitudinal beam, wherein the beams extend between the ends and are configured with accessory holes, the beams spaced apart from and parallel to one another thereby forming a cradle between the beams configured to carry the UUV, the kit comprising:

laterally and vertically adjustable support structures extending perpendicularly between and underneath the beams and mounted to the accessory holes and forming a bottom of the cradle, wherein each of the laterally and vertically adjustable support structures further comprise:

two hollow horizontal members each having a cradle end, a beam end and a square cross-section, one of the two horizontal members is dimensioned to slide within the other at respective cradle ends to accommodate selective lateral spacing between the beams, each horizontal member further having a horizontal connector at the beam end; and two vertical members, each configured to slide vertically within accessory holes disposed within the beams, a vertical connector at a vertical bottom end for selectively mating with a respective horizontal connector and a plurality of evenly spaced through holes along a length of the vertical member configured to receive a cotter pin to selectively adjust the cradle vertical distance from the beams;

a winch with a tow cable located between the open and the towing ends and configured to selectively reel the tow cable connected between the winch and the UUV;

left and right guide rails symmetrically mounted on respective beams at the open end configured to guide the UUV into and out of the cradle when submerged in water, the guide rails capable of orientation in an open V-shaped position when viewed from above; and the guide rails each further comprising perpendicularly extending cable guide posts configured to maintain the tow cable within the open end of the trailer.

21. The kit according to claim 20, wherein each of the left and right guide rails includes a mounting adapter assembly, the assembly comprising:

two mounting adapters, each of the adapters configured for mounting within adjacent accessory holes disposed along the beams; and a support plate attached to the two mounting adapters.

22. The kit according to claim 21, wherein each of the support plates further comprises:

a pivot bracket extending from a bottom side of the support plate, the pivot bracket including a pivot bracket hole passing through the pivot bracket;

a pivot bolt configured for rotational engagement by passing through the pivot hole of a first of the two mounting adapters and the pivot bracket hole, thereby defining a tilt axis;

a slotted bracket extending from the bottom side of the support plate and spaced apart from the pivot bracket, the slotted bracket including a curved slot hole passing through the slotted bracket; and a slot bolt configured for slotted engagement within the curved slot hole when mounted to the pivot hole of a second of the two mounting adapters.

23. The kit according to claim 21, wherein each of the mounting adapter assemblies allows the respective guide rail to tilt about a tilt axis thereby compensating for boat ramp grade and maintaining horizontal orientation of the respective guide rail during launch and recovery.

* * * * *